US010182466B2

(12) United States Patent
Nirantar et al.

(10) Patent No.: US 10,182,466 B2
(45) Date of Patent: Jan. 15, 2019

(54) OPTIMIZING KEEPALIVE AND OTHER BACKGROUND TRAFFIC IN A WIRELESS NETWORK

(71) Applicant: Seven Networks, LLC, Marshall, TX (US)

(72) Inventors: Abhay Nirantar, San Carlos, CA (US); Andrii Kokhanovskyi, Kiev (UA); Nariman D. Batlivala, San Carlos, CA (US); Rami Al-Isawi, San Carlos, CA (US); Sungwook Yoon, San Carlos, CA (US); Michael Fleming, San Carlos, CA (US); Ari Backholm, Los Altos, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 15/787,958

(22) Filed: Oct. 19, 2017

(65) Prior Publication Data
US 2018/0042067 A1    Feb. 8, 2018

Related U.S. Application Data

(63) Continuation of application No. 15/235,241, filed on Aug. 12, 2016, now Pat. No. 9,820,330, which is a
(Continued)

(51) Int. Cl.
*H04W 74/04* (2009.01)
*H04L 29/06* (2006.01)
(Continued)

(52) U.S. Cl.
CPC ........... *H04W 76/25* (2018.02); *H04L 5/0053* (2013.01); *H04L 67/2852* (2013.01);
(Continued)

(58) Field of Classification Search
None
See application file for complete search history.

(56) References Cited

U.S. PATENT DOCUMENTS 6,590,875 B1    7/2003    Niwa
6,693,919 B1    2/2004    Kameyama
(Continued)

FOREIGN PATENT DOCUMENTS

| EP | 2595424 A1 | 5/2013 |
|---|---|---|
| WO | WO2011134495 A1 | 11/2011 |
| WO | WO2012121784 A2 | 9/2012 |

OTHER PUBLICATIONS

USPTO, Corrected Notice of Allowability in U.S. Appl. No. 15/281,704 dated Dec. 12, 2017.
(Continued)

*Primary Examiner* — Robert C Scheibel
(74) *Attorney, Agent, or Firm* — NK Patent Law

(57) ABSTRACT

Systems and methods for optimizing keepalives or other non-interactive or background traffic from applications on a mobile device are disclosed. A keepalive optimizer can detect keepalive and other background traffic and optimize such traffic by blocking keepalives, advancing or delaying execution of keepalives, delaying repeatable background requests based on radio state, device state or characteristics, policy, transaction characteristics, application characteristics, and/or the like. The disclosed keepalive optimization methods facilitate management of traffic and/or conservation of resources on the mobile device and the network. The keepalive optimization can be performed by an application sending the keepalives or by a local proxy on the mobile device.

12 Claims, 27 Drawing Sheets

Related U.S. Application Data continuation of application No. 14/494,526, filed on Sep. 23, 2014, now Pat. No. 9,445,368, which is a continuation of application No. PCT/US2014/036669, filed on May 2, 2014.

(60) Provisional application No. 61/836,039, filed on Jun. 17, 2013, provisional application No. 61/836,095, filed on Jun. 17, 2013, provisional application No. 61/833,838, filed on Jun. 11, 2013.

(51) Int. Cl.

| | | |
|---|---|---|
| *H04W 76/25* | (2018.01) | |
| *H04W 52/02* | (2009.01) | |
| *H04W 76/20* | (2018.01) | |
| *H04W 24/02* | (2009.01) | |
| *H04W 88/02* | (2009.01) | |
| *H04W 28/02* | (2009.01) | |
| *H04W 12/00* | (2009.01) | |
| *H04L 5/00* | (2006.01) | |
| *H04L 29/08* | (2006.01) | |
| *H04W 72/04* | (2009.01) | |

(52) U.S. Cl.
CPC ............ *H04L 69/16* (2013.01); *H04W 12/00* (2013.01); *H04W 24/02* (2013.01); *H04W 28/0231* (2013.01); *H04W 52/0251* (2013.01); *H04W 52/0258* (2013.01); *H04W 72/048* (2013.01); *H04W 76/20* (2018.02); *H04W 88/02* (2013.01); *Y02D 70/00* (2018.01); *Y02D 70/1224* (2018.01); *Y02D 70/1242* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/23* (2018.01); *Y02D 70/26* (2018.01)

(56) References Cited

U.S. PATENT DOCUMENTS

| | | | |
|---|---|---|---|
| 7,092,399 B1 | 8/2006 | Cheriton | |
| 7,366,093 B2 | 4/2008 | Alfano et al. | |
| 7,589,223 B2 | 9/2009 | Bildstein et al. | |
| 7,752,330 B2 | 7/2010 | Olsen et al. | |
| 7,768,939 B1 | 8/2010 | Trivedi et al. | |
| 8,731,542 B2* | 5/2014 | Tervahauta | H04L 43/0811 455/423 |
| 8,782,222 B2 | 7/2014 | Luna et al. | |
| 8,831,658 B2 | 9/2014 | Meylan et al. | |
| 9,009,250 B2 | 4/2015 | Luna | |
| 2003/0046433 A1 | 3/2003 | Luzzatti et al. | |
| 2004/0068665 A1 | 4/2004 | Fox et al. | |
| 2004/0186889 A1 | 9/2004 | Washburn | |
| 2004/0219940 A1 | 11/2004 | Kong et al. | |
| 2004/0264396 A1 | 12/2004 | Ginzburg et al. | |
| 2005/0163048 A1 | 7/2005 | Arora et al. | |
| 2005/0188098 A1* | 8/2005 | Dunk | H04L 67/14 709/232 |
| 2006/0092841 A1 | 5/2006 | Lloyd et al. | |
| 2006/0182141 A1* | 8/2006 | Duggirala | H04L 29/06 370/465 |
| 2006/0282408 A1 | 12/2006 | Wisely et al. | |
| 2007/0111764 A1 | 5/2007 | Park | |
| 2007/0174420 A1 | 7/2007 | Khusial et al. | |
| 2007/0288469 A1 | 12/2007 | Shenfield | |
| 2008/0008095 A1 | 1/2008 | Gilfix | |
| 2008/0039032 A1 | 2/2008 | Haumont | |
| 2008/0115152 A1 | 5/2008 | Welingkar et al. | |
| 2008/0140795 A1 | 6/2008 | He et al. | |
| 2008/0207182 A1 | 8/2008 | Maharajh et al. | |
| 2008/0305819 A1 | 12/2008 | Chun et al. | |
| 2009/0112778 A1 | 4/2009 | Beck et al. | |
| 2009/0122699 A1 | 5/2009 | Alperovitch et al. | |
| 2009/0149203 A1 | 6/2009 | Backholm et al. | |
| 2009/0265752 A1 | 10/2009 | Sharif-Ahmadi et al. | |
| 2010/0083255 A1 | 4/2010 | Bane et al. | |
| 2010/0093273 A1 | 4/2010 | Hohl | |
| 2010/0214942 A1 | 8/2010 | Du et al. | |
| 2010/0312946 A1 | 12/2010 | Bold et al. | |
| 2011/0153937 A1 | 6/2011 | Annamalaisami et al. | |
| 2011/0161403 A1 | 6/2011 | Fu | |
| 2011/0177847 A1 | 7/2011 | Huang | |
| 2011/0194539 A1 | 8/2011 | Blasinski et al. | |
| 2011/0202988 A1 | 8/2011 | Otranen et al. | |
| 2011/0283359 A1 | 11/2011 | Prince et al. | |
| 2011/0320614 A1 | 12/2011 | Makavy et al. | |
| 2012/0023190 A1 | 1/2012 | Backholm et al. | |
| 2012/0023226 A1 | 1/2012 | Petersen et al. | |
| 2012/0023236 A1 | 1/2012 | Backholm et al. | |
| 2012/0108225 A1 | 5/2012 | Luna et al. | |
| 2012/0110109 A1 | 5/2012 | Luna et al. | |
| 2012/0110173 A1 | 5/2012 | Luna et al. | |
| 2012/0135726 A1 | 5/2012 | Luna et al. | |
| 2012/0149352 A1 | 6/2012 | Backholm et al. | |
| 2012/0167118 A1* | 6/2012 | Pingili | G06F 1/3206 719/318 |
| 2012/0185597 A1 | 7/2012 | Luna | |
| 2012/0254401 A1 | 10/2012 | Adams et al. | |
| 2012/0256009 A1* | 10/2012 | Mucignat | G05D 23/1905 236/1 C |
| 2012/0324168 A1 | 12/2012 | Rempel | |
| 2013/0007119 A1 | 1/2013 | Zarka et al. | |
| 2013/0031600 A1 | 1/2013 | Luna et al. | |
| 2013/0031601 A1 | 1/2013 | Bott | |
| 2013/0044702 A1 | 2/2013 | Jayaraman et al. | |
| 2013/0060815 A1 | 3/2013 | Saeki | |
| 2013/0067063 A1* | 3/2013 | Vasseur | H04L 45/026 709/224 |
| 2013/0132941 A1 | 5/2013 | Lindeman et al. | |
| 2013/0142050 A1 | 6/2013 | Luna | |
| 2013/0159511 A1 | 6/2013 | Backholm et al. | |
| 2013/0163431 A1 | 6/2013 | Backholm et al. | |
| 2013/0163740 A1 | 6/2013 | T. et al. | |
| 2013/0165084 A1 | 6/2013 | Xu et al. | |
| 2013/0170507 A1 | 7/2013 | Hsueh et al. | |
| 2013/0188543 A1 | 7/2013 | Dwyer et al. | |
| 2013/0190032 A1 | 7/2013 | Li | |
| 2013/0191544 A1 | 7/2013 | Caldeira de Andrada et al. | |
| 2013/0203433 A1 | 8/2013 | Luna et al. | |
| 2013/0294307 A1 | 11/2013 | Johansson et al. | |
| 2014/0051485 A1* | 2/2014 | Wang | H04W 4/70 455/574 |
| 2014/0064209 A1* | 3/2014 | Anchan | H04W 72/0406 370/329 |
| 2014/0119195 A1* | 5/2014 | Tofighbakhsh | H04W 52/0251 370/241 |
| 2014/0153460 A1 | 6/2014 | Shrivastava et al. | |
| 2014/0226562 A1 | 8/2014 | Shah et al. | |
| 2014/0280892 A1 | 9/2014 | Reynolds et al. | |
| 2015/0131453 A1* | 5/2015 | Tofighbakhsh | H04W 52/0251 370/241 |

OTHER PUBLICATIONS

SIPO, Office Action in Chinese Application No. 201480044503.7 dated Jul. 12, 2018.
InnovationQ-IP.com: Search results of "Monitoring keep-alive message", Aug. 31, 2016, https://iq.ip.com/discover.
USPSTO, Non-Final Rejection in U.S. Appl. No. 15/787,376 dated Apr. 25, 2018.
USPTO, Final Office Action in U.S. Appl. No. 15/787,376 dated Sep. 21, 2018.

* cited by examiner

OPTIMIZING KEEPALIVE AND OTHER BACKGROUND TRAFFIC IN A WIRELESS NETWORK

CROSS-REFERENCE TO RELATED APPLICATIONS

This application a continuation application of U.S. patent application Ser. No. 15/235,241 filed on Aug. 12, 2016 entitled "OPTIMIZING KEEPALIVE AND OTHER BACKGROUND TRAFFIC IN A WIRELESS NETWORK", now U.S. Pat. No. 9,820,330 issued on Nov. 14, 2017, which is a continuation application of U.S. patent application Ser. No. 14/494,526 filed on Sep. 23, 2014 entitled "OPTIMIZING KEEPALIVE AND OTHER BACKGROUND TRAFFIC IN A WIRELESS NETWORK", now U.S. Pat. No. 9,445,368 issued on Sep. 13, 2016, which is a continuation of PCT Patent Application No. PCT/US14/36669 filed on May 2, 2014 entitled "OPTIMIZING KEEPALIVE AND OTHER BACKGROUND TRAFFIC IN A WIRELESS NETWORK", which further claims priority to and the benefit of U.S. Provisional Patent Application Ser. No. 61/833,838 titled "KEEPALIVE ALGORITHMS FOR SIGNALING OPTIMIZATION IN A WIRELESS NETWORK FOR TRAFFIC UTILIZING PROPRIETARY AND NON-PROPRIETARY PROTOCOLS" filed on Jun. 11, 2013; U.S. Provisional Patent Application Ser. No. 61/836,095 titled "ENGINEERING DELAY IN SENDING BACKGROUND REQUESTS FOR SIGNALING OPTIMIZATION IN A WIRELESS NETWORK FOR TRAFFIC UTILIZING PROPRIETARY AND NON-PROPRIETARY PROTOCOLS" filed on Jun. 17, 2013; and U.S. Provisional Patent Application Ser. No. 61/836,039 titled "IDENTIFICATION AND REPORTING OF KEEPALIVE MESSAGES AND OTHER NON-USER INTERACTIVE TRAFFIC IN A MOBILE NETWORK" filed on Jun. 17, 2013. The entire content of the aforementioned applications are expressly incorporated by reference herein.

BACKGROUND

Many applications on mobile devices utilize long-lived connections to be able to immediately receive incoming data from their servers in the network. Examples of such "always-on" applications can include instant messaging applications (e.g., SKYPE, VIBER), push email clients and Voice over Internet Protocol (IP) applications. In order to maintain a long-lived connection, applications are designed to periodically send heartbeat messages or keepalive messages (or simply keepalives or KAs) to their servers.

While the keepalive messages from these always-on applications allow the applications to receive messages with less delay, this improvement in latency has associated costs. These costs include consumption of a significant amount of energy in mobile devices, additional signaling in the mobile network and bandwidth consumption. For example, to be able to send keepalive messages frequently, a mobile device needs to frequently transition its radio between a high powered state and an idle state or remain in a high powered state instead of the idle state for a longer period of time, resulting in fast draining of battery. These radio transitions also cause additional signaling in the networks as radio resource control (RRC) messages need to be exchanged between the mobile device and base station to establish a radio link. Furthermore, each keepalive message can be as large as 20-60 bytes in size, and a large number of such keepalive messages from multiple apps can add up to consume a substantial chunk of the network bandwidth.

BRIEF DESCRIPTION OF THE DRAWINGS

FIG. 1A-2 is an example schematic diagram that depicts optimization of keepalive traffic by advancing a keepalive from its expected schedule.

FIG. 1A-3 is an example schematic diagram that depicts optimization of keepalive traffic by delaying a keepalive beyond the keepalive period.

FIG. 1A-4 is an example schematic diagram that depicts optimization of background traffic by delaying repeatable background requests.

FIGS. 1A-5-1A-9 are example diagrams that depict keepalive learning algorithms to generate a rule set for isolating safe keepalives from unsafe keepalives and selectively blocking the safe keepalives.

FIG. 4 illustrates a block diagram depicting an example of server-side components, in certain embodiments of a distributed proxy and cache system residing on a host server that manages traffic in a wireless network (or broadband network) for resource conservation, content caching, and/or traffic management.

FIGS. 5-6 illustrate example logic flow diagrams for optimizing keepalives by categorizing a keepalive as safe or unsafe and transmitting an unsafe keepalive from a mobile device to the network, while blocking a safe keepalive from going out to the network.

FIG. 7 illustrates an example logic flow diagram for optimizing keepalive traffic by advancing a keepalive from its expected schedule.

FIG. 8 illustrates an example logic flow diagram for optimizing keepalive traffic by delaying a keepalive beyond the keepalive period.

FIGS. 9-11 illustrate example logic flow diagrams for optimizing background traffic by delaying repeatable background requests.

DETAILED DESCRIPTION

Figures 1, 1A:
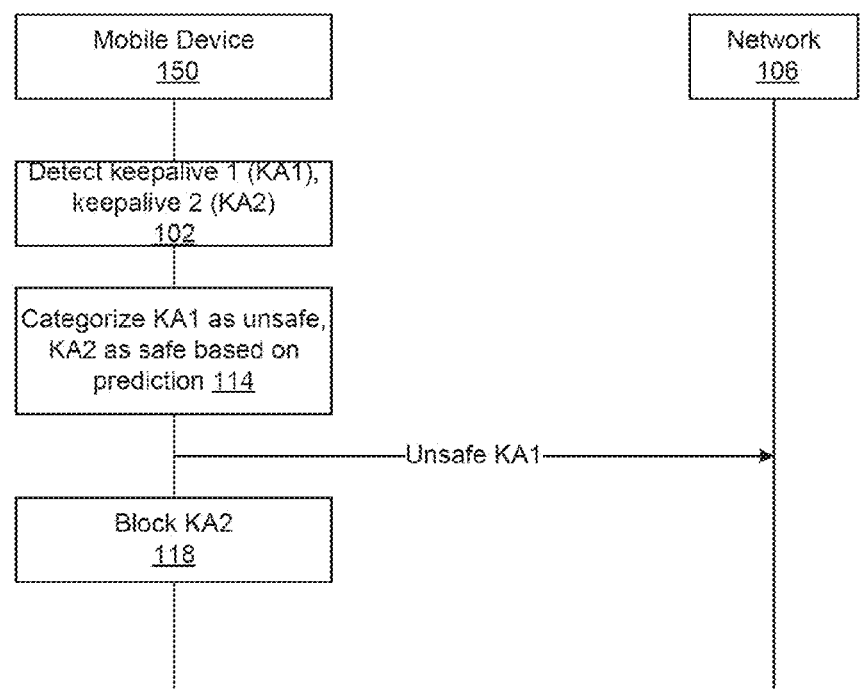
FIG. 1A-1 is an example schematic diagram that depicts optimization of keepalives by categorizing a keepalive as safe or unsafe and transmitting an unsafe keepalive from a mobile device at one end of a connection to another end of the connection over a network.

Embodiments of the present disclosure include systems and methods for optimizing keepalives and other background traffic from mobile applications on mobile devices to reduce energy consumption, bandwidth consumption and signaling in wireless networks.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Various embodiments for optimizing network transactions or periodic transactions in wireless networks including mobile networks and wireless local area networks are disclosed herein. Network transactions can include keepalive transactions and other periodic transactions. Network transactions can also include background transactions which can be periodic. The methodologies and techniques for optimizing keepalive and other background traffic disclosed herein can be implemented by a local proxy or client-side proxy residing on a mobile device in one embodiment. In another embodiment, an application can implement the keepalive and other background traffic optimization methodologies and techniques.

Embodiments of the present disclosure are based on Transport Control Protocol (TCP) streaming optimization. Application level protocols such as HTTP (with or without SSL encapsulation) are well understood and nonproprietary. However, an increasing amount of mobile traffic is moving from the HTTP space to vendor-specific proprietary protocols. For example, GOOGLE, WHATSAPP, SKYPE, YAHOO MAIL 2.0 and the like use proprietary protocols. The embodiments of the present disclosure utilize an architecture that is able to optimize traffic over both proprietary and nonproprietary protocols. In one embodiment, TCP stream is passed as a byte stream from an application to a local proxy (TCP session 1) and from the local proxy to host/application/content server (TCP session 2). The application is allowed to establish the necessary handshakes, and the local proxy observes patterns within the stream. Instead of, or in addition to, identifying transactions based on HTTP headers and other protocol specificity, transactions are identified based on idle periods between them, without requiring any protocol-specific understanding of the binary stream. The content similarity is established at basic level by exact binary match, and binary-level normalizations can be applied to accommodate protocol-specificities, where they are known.

Embodiments disclosed herein can utilize TCP streaming optimization to identify transactions within a TCP stream and can further categorize those transactions as (1) keepalives or heartbeats, (2) other background (or non-user-interactive) or (3) user-interactive. The categorization of transactions within a TCP stream can be used to optimize keepalive and background traffic in a wireless network to reduce signaling and conserve resources of the client device and the wireless network to which the client device is connected.

Keepalive transactions are transactions that seem to be there with no other purpose than to keep a TCP connection alive. Keepalives can be identified based on a combination of parameters, including, but not limited to: periodicity, size thresholds, and similar/repeating content based on the knowledge of the actual application level protocol or the like. In one embodiment, keepalives can be detected in real-time for keepalive optimization. Various algorithms can be used to detect keepalives. For example, one example keepalive detection algorithm leverages traffic reports to perform detection retrospectively. Another keepalive detection algorithm can use network messages and/or application profiles to detect keepalives as they occur and take actions. Various algorithms for detecting or identifying keepalives are disclosed in a related application Ser. No. 61/836,039 titled "IDENTIFICATION AND REPORTING OF KEEP ALIVE MESSAGES AND OTHER NON-USER INTERACTIVE TRAFFIC IN A MOBILE NETWORK" filed on Jun. 17, 2013, which is expressly incorporated by reference herein.

Other background traffic and user interactive traffic can be distinguished from each other based on indications or proxies of user activity alone or in combination with information such as status of the application performing the data transfer (e.g., foreground/background, active, non-active), status of output mechanisms, such as screen, audio, notification LED, Bluetooth, NFC, RFID, touch sensor, any other types of sensors, camera, etc., readings from the any other sensors or detectors of the device, such as microphone, accelerometer, biosensors, gyroscope, location sensors, motion sensors, or the like. For example, a request that is generated while a screen of a mobile device is off is an example of a background request because the request occurred when the mobile device was not being actively used by a user (i.e., the device was on background mode). By way of another example, a request that occurs when there is no user activity and the radio is off (or radio state is idle) is also a background request. On the other hand, a request from an application that a user is interacting with is an example of a user-interactive request.

As used herein, a background request from an application on a mobile device includes a request that occurs when a user is not actively using the application (i.e., the application is in the background mode) or not actively using the mobile device (i.e., the mobile device is in the background mode).

As used herein, a user-interactive request from an application on a mobile device includes a request that occurs when a user is actively interacting with the application or the user is expecting a response to the request.

Embodiments of the present disclosure also include systems and methods which facilitate management of traffic, content caching, and/or resource conservation between mobile devices (e.g., wireless devices) and an application server or content provider.

In one embodiment, optimizing keepalives includes identifying and blocking unnecessary keepalives. Keepalives can be identified or predicted as being "unnecessary" (or safe to block or simply "safe") based on various criteria. In one embodiment, safe keepalives are keepalives whose following transactions are also the same keepalives (e.g., same/similar byte sizes). In one embodiment, a keepalive is safe if other traffic (e.g., from the same or different applications) is occurring on the same socket or any presence of any traffic from the same application is detected. In one embodiment, necessary (or unsafe to block or simply "unsafe") keepalives are keepalives whose following transactions are not the same keepalives (e.g., byte sizes may be different). For example, a keepalive may be necessary, if user activity and/or non-keepalive data for the given application is detected or anticipated in the TCP stream before the next keepalive. In this case, if the first keepalive is eliminated, the connection may not be available for the non-keepalive data when such data is to be sent. In one embodiment, as keepalives themselves may carry payload data, user activity after such a keepalive may be an indication that a keepalive did carry payload data and was thus not necessary. In many instances, retrospective observation of traffic patterns may be used to learn safe/unsafe characteristics of keepalives and use such information to evaluate subsequent keep alive transactions.

In one embodiment, keepalives that are identified as being safe keepalives can be blocked, while keepalives that are identified as unsafe keepalives can be allowed to go out to the network. A flexible parameter can be utilized to adjust the aggressiveness with which keepalives are identified as safe or unsafe.

Referring to FIG. 1A-1, an example schematic diagram depicting optimization of keepalives by categorizing a keepalive as safe or unsafe and transmitting an unsafe keepalive while blocking a safe keepalive is illustrated. A mobile device 150 coupled to a network 106 includes mobile applications, some of which may utilize keepalives (KAs) to maintain a long-lived connection. As shown, a keepalive optimizer (e.g., keepalive optimizer 300 which can be a component of a local proxy 175 in the mobile device 150 of FIG. 1C) of the mobile device 150 detects KA1 and KA2 from application 1 and application 2 respectively at block 102. The keepalive optimizer categorizes KA1 as unsafe and KA2 as safe based on prediction (or other criteria) at block 114. Based on such categorization, the keepalive optimizer allows the unsafe KA1 to go to the network 106 (i.e., go to its destination server across the network 106). As for KA2 that was categorized as safe, the keepalive optimizer blocks it at block 118, preventing KA2 from reaching its destination server. As illustrated by this example, by identifying which keepalives are necessary and which ones are unnecessary, the keepalive optimizer of the present disclosure can reduce the keepalive traffic and conserve resources in the mobile device 150 and the network 106.

In addition to some of the methods of categorization or classification of keepalives as safe or unsafe discussed above, in one embodiment, the keepalive optimizer can utilize a predictive method to learn and block safe keepalives. In this embodiment, "long enough" keepalives, i.e., the long unnecessary keepalive chains that out-benefit potential cost of blocking such as TCP re-establishment, and other unknown cost due to user inconvenience or application's behavior can be detected and/or blocked. Blocking unnecessary keepalives can include three stages including observing traffic for a learning period (e.g., either for a single device run-time, or for multiple devices centrally) to determine factors that can be used to perform strongest prediction of necessity (i.e., factors for predicting whether a keepalive is necessary or unnecessary). Such factors can include user, application, time-of-the-day, day-of-the-week, screen state pattern, number of non-necessary keepalives in the immediate past and a number of others features and/or parameters. The second stage includes the execution, where the necessary keepalives are allowed to go out to the network normally, while the unnecessary keepalives are blocked. The third stage involves validation, where traffic following the blocking event is observed to determine, for example, whether a keepalive that was predicted to be unnecessary was actually unnecessary.

In one embodiment, the predictive method for learning and blocking safe keepalives is based on decision list learning. The method utilizes predictors listed in Table 1 and confidence parameters listed on Table 2 for determining a rule set that can isolate safe to block keepalives (i.e., safe KA) from unsafe to block keepalives (i.e., unsafe KA). The predictors can be collected for every detected keepalive per user/application. "Current" is used herein to describe the keepalive being detected. These are recorded in an analysis field in the netlog. These keepalive data can be stored in a persistent local database storage (e.g., database 310 in FIG. 3A). The stored keepalive data can be used for learning. Old keepalive data can be flushed out from time to time.

TABLE 1

Keepalive Predictors

|   | Predictor | Data Type | Parameter name, short Acronym Form | Explanation |
| --- | --- | --- | --- | --- |
| 1 | Hour | integer | F1, H | The current keepalive's transaction log time's local hour. |
| 2 | AfterOnScreen | binary | F2, E | There was an onscreen activity between last keepalive detected and the current keepalive. |
| 3 | Saferun | integer | F3, SR | The length of unnecessary keepalive sequences before the current keepalive. If this is the first keepalive in the current TCP session, this is 0. |
| 4 | Intervals | integer | F4, I | The UNIX epoch difference between the current keepalive and last keepalive |
| 5 | OnScreenDistance | integer | F5, OSD | The UNIX epoch difference between the current keepalive and the last on screen activity |
| 6 | Bytes | integer | F6, B | The keepalive's transaction log's Fromapp bytes + Fromnet bytes |

TABLE 1-continued

Keepalive Predictors

| | Predictor | Data Type | Parameter name, short Acronym Form | Explanation |
|---|---|---|---|---|
| 7 | TCP Session ORDER | integer | F7, CO | In the current TCP session, the order of the current keepalive |
| 8 | DayOfWeek | integer | F8, DW | The current keepalive's log time's LOCAL day of week |
| 9 | Unnecessary Chain Length | integer | F9, UCL | This is going to be recorded not when the keepalive is detected but after the end of successive unnecessary keepalives; for every keepalive that belongs to the current unnecessary keepalives, the final unnecessary chain length is recorded. |
| 10 | Decision | binary | R1, D: | After learning, whether the current keepalive is blocked or not |
| 11 | Probability | integer | R2, P | After learning, the probability for the Decision |
| 12 | Rule | formatted output | R3, R | After learning, the rule applied (Feature (1-8), Equality (−1 <=, 0, =, 1 >), Value (integer)) |

TABLE 2

Keepalive Confidence Parameters

| | Confidence Parameter | Data type | Parameter name, short Acronym Form | Explanation |
|---|---|---|---|---|
| 1 | Minimal Expected Unnecessary Chain Length | integer | P1, MCL | The minimally beneficial unnecessary chain length to cover the potential cost of TCP reestablishment and other unknown costs. |
| 2 | Confidence probability | integer | P2, P | The minimal confidence probability of the prediction |
| 3 | Training Period | integer | P3, T | Minimal number of keepalives for the application/local proxy to act on |
| 4 | Data Validity Period | integer | P4, V | Maximal days for the application/local proxy to keep the keepalive data |
| 5 | Maximum Block Length | integer | P5, X | How long can a successive blocking work |
| 6 | Keepalive Blocking Applicable Apps | | P6, A | Applications for which keepalive blocking can be applied |

After gathering the minimal number of keepalives (P3), the keepalive optimizer implementing a decision list learning and blocking algorithm initiates rule learning from a collection of keepalive data having at least some of the features listed in Table 1 above. From the keepalive data collection, those keepalives that satisfy F9(UCL)>P1 can be identified as safe keepalives (i.e., safe KAs), and those keepalives that satisfy F9(UCL)<=P1 can be identified as unsafe keepalives (i.e., unsafe KAs). FIG. 1A-5 shows an example collection of keepalive data, identified as safe KAs and unsafe KAs, specific to a user/application and retrieved from a persistent database storage (e.g., database storage 310 in FIG. 3A). In one example embodiment, the keepalive optimizer determines a rule set that covers only safe KAs by applying one or more constraints. For example, when an initial constraint C1 can be applied to isolate at least some of the safe KAs from unsafe KAs. In the example of FIG. 1A-6, the constraint F3(Saferun)>3 has been applied and it covers only safe KAs as shown. The keepalive optimizer has thus learned the first rule including the constraint F3(Saferun)>3. The safe KAs covered by the first rule are then eliminated from the collection of keepalive data and the process is repeated with remaining data.

For example, as shown in FIG. 1A-7, another constraint (OSD, >, 10000) has been applied, and it covers not only some safe KAs but also many unsafe KAs. The keepalive optimizer then applies another constraint (H, =, 2, 3, 5, 6) in addition to (O, >, 10000), which isolates the safe KAs from the unsafe KAs as shown in FIG. 1A-8. All or at least some of the predictors can be evaluated by the keepalive optimizer in learning rules. For example, as shown in FIG. 1A-9, the constraint (Bytes, <, 1000) does not completely isolate the safe KAs from the unsafe KAs. When no other constraint can effectively isolate safe KAs from unsafe KAs, the rule learning process stops. The end decision list in the above example includes a rule set comprising the following two rules:

Rule 1: (SR, >, 3)
Rule 2: ((OSD, >, 10000), (H, =, 2, 3, 5, 6))

The keepalive optimizer can arrange the learned rules in an order and sequentially apply the learned rules to a new keepalive to determine whether the new keepalive can be blocked. In one embodiment, the keepalive optimizer calculates a rule's probability of success compared to a confidence probability threshold (P2) to determine whether to allow the rule set to be applied in categorizing a keepalive as safe or unsafe.

In one embodiment, the keepalive optimizer can implement a binary decision learning algorithm to learn and block a keepalive. For example, long unnecessary keepalive chains can be learned and as soon as a keepalive is detected, the disclosed technology can decide if the keepalive is going to be long or not (e.g., is the unnecessary keepalive chain length greater than a threshold (e.g., 5)). If the detected keepalive is going to be longer than the minimal unnecessary keepalive chain length, the keepalive optimizer decides to block the keepalive.

In one embodiment, the binary decision learning algorithm as part of the learning process puts each keepalive train into bins. Starting with Hour bins (24 bins) for example, the algorithm determines if any of the bins are not homogenous. A bin is homogenous if every keepalive train in the bin is in the same category, i.e., necessary or unnecessary. If any of the bins is not homogenous, the algorithm splits the bin based on splitting points such as afteronscreen, bytes (fromapp and fromnet), onscreendistance, intervals, CSM order, weekday, or the like. When a new keepalive is detected, the binary decision learning algorithm puts the keepalive into the corresponding bin (e.g., hour/afteronscreen/bytes>3 bin) and follows the majority in the bin to determine whether to block or unblock the keepalive. If there is no clear majority or not enough prior chains, blocking is prevented.

In one embodiment, optimizing keepalives includes identifying and blocking keepalives by blocking application. In one embodiment, keepalives can be identified based on parameters such as, but not limited to: periodicity, size thresholds, similar/repeating content, knowledge of the actual application level protocol, applications that are keepalive heavy (e.g., applications that send keepalives frequently), or a combination thereof. Applications that exhibit certain keepalive behavior can then be blocked using one or more keepalive blocking policies which can be managed by a policy enforcement module. Based on the blocking policies, certain type of keepalive behavior can be blocked. For example, applications that are keepalive heavy or exhibits a certain keepalive behavior can be blocked for a given percent of keepalive periods. In one embodiment, blocking the applications to block the keepalives can include blocking specific ports for the given percent of keepalive periods. In some instances, this blocking strategy may have a user-impact, cause additional bytes, and/or cause impacts beyond keepalives. The blocking strategy can be refined by using some of the other keepalive optimization methods described in the present disclosure.

Figures 1, 1A, 2:
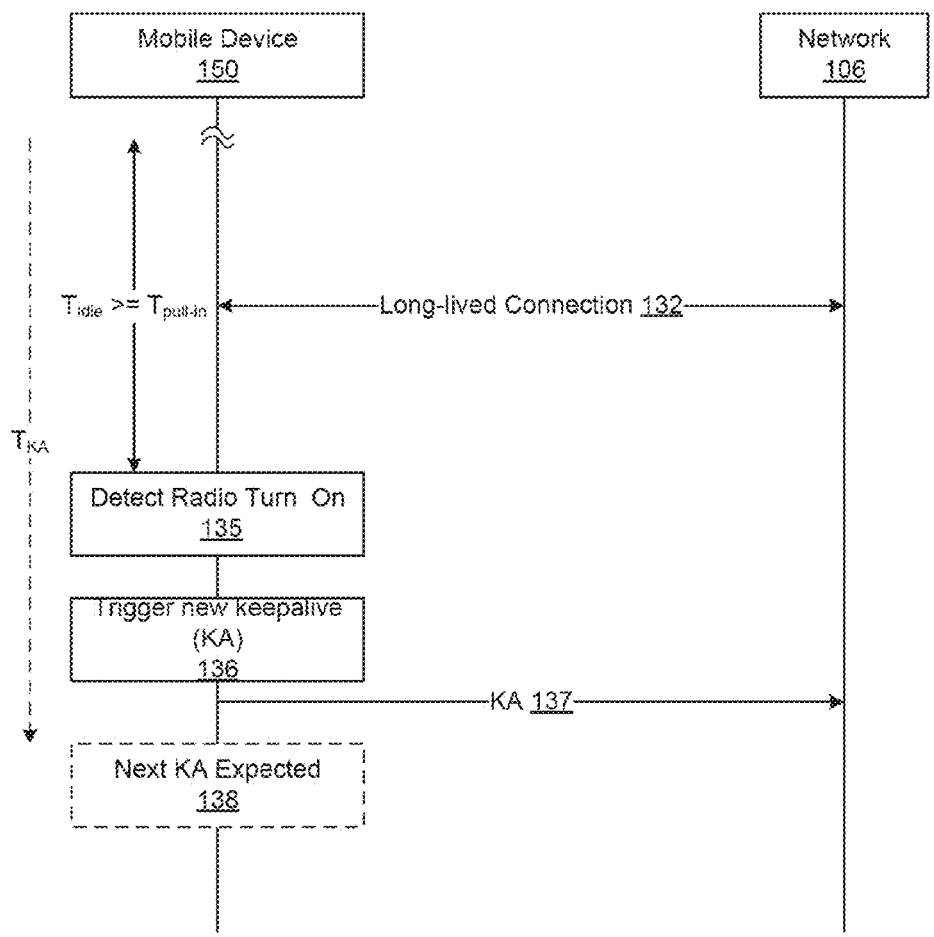
Figures 1, 1A, 2, 3:
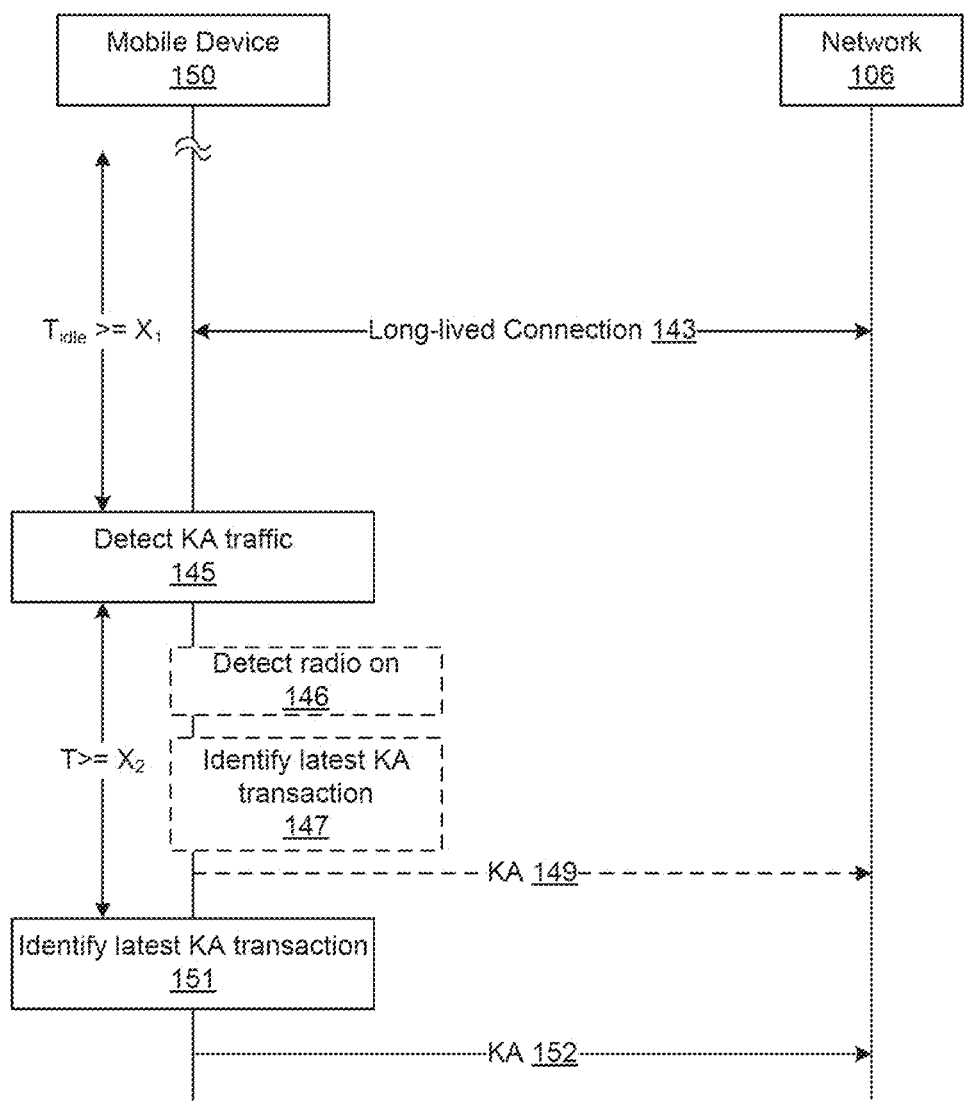

In one embodiment, keepalives can be optimized by executing them in advance of their expected schedule as shown in the example schematic diagram of FIG. 1A-2. In this embodiment, a keepalive period ($T_{KA}$) for an application Y on a mobile device 150 can be identified and a period $T_{pull-in}$ for the application Y can be defined, where period $T_{pull-in}$ is a period to pull a keepalive in from its expected schedule.

$T_{pull-in}$ can be determined using multiple mechanisms. In one embodiment, $T_{pull-in}$ is a value that is selected to minimize the additional time connected (as transmitting more data even if the radio is already up can slightly increase the length of a transaction) and increased battery consumption (as CPU consumption of more frequent transactions increases slightly) while also minimizing the number of instances where radio needs to be turned on (and cause an additional connection) because the end of the allowed period is reached. This can be done dynamically by observing the realized traffic pattern on each device and weighting potential negative time connected/battery probability against probability for additional connections (which also results in additional time connected and battery consumption). This can be done on an ongoing basis using previous X hours as the sample, or learning over a longer period of time, utilizing, for example, time-of-the-day, day-of-the-week and screen state as additional parameters to estimate the probabilities. Alternatively, the same value can be used for all users, that would optimize the probability across the entire user base.

After a socket for the application Y has been idle for longer than (i.e., $T_{pull-in}$ $T_{idle}>T_{pull-in}$) and a keepalive optimizer detects the radio of the mobile device 150 go up at block 135 (i.e., radio turns on or transitions from an idle state to a connected state, or lower power state to higher power state), the keepalive optimizer triggers a new keepalive 136 which is transmitted to the network 106. The new keepalive 136 is executed before the end of the $T_{KA}$ in advance of the next expected KA 138.

In one embodiment, the new keepalive 136 is triggered by terminating the connection or dropping the application socket. When the connection is terminated, application Y attempts to connect to the network 106 by piggybacking on the radio connection that was already established, which allows for reduction in signaling. When it is time to send the new keepalive 136, a new handshake would be needed to establish a connection, which would result in an increase in bytes transferred. To avoid additional bytes for handshakes, mechanisms other than dropping the socket can be used to trigger a new keepalive on a per-application basis. For example, a synthetic keepalive can be created.

In one embodiment, executing keepalive in advance may start either after identifying the first keepalive period ($T_{KA}$), or it can start working even before the first successful keepalive period is identified. The latter is useful in a case where the network closes the socket with shorter duration than the application sends keepalives and the long-lived socket would keep closing. This would cause user experience issues as the socket is not available all the time for pushing data to the mobile device. By sending the keepalives early even without the application being able to make them successfully, the keepalive optimizer can keep the long-lived socket alive and make the user experience better.

In one embodiment, keepalives can be optimized by extending the keepalive period as shown in the schematic diagram of FIG. 1A-3.

A period X1 and/or pattern Z, and period X2 for application Y can be defined. A long-lived connection 143 may be established between a socket for application Y and the network 106. After the socket for application Y has been idle for longer than X1 (i.e., $T_{idle}>X1$), or if traffic matches pattern Z, the keepalive optimizer of the mobile device 150 does not send a keepalive detected at block 145 out to the network 108, until either X2 seconds have passed from the first traffic after X1. After that, the keepalive optimizer sends the latest transaction 152 to the network 106. The latest transaction can be identified based on a transaction boundary defined by a pause (e.g., a few second pause) between a data stream at block 151. Any response from the network is then relayed back to the application normally. Alternately, when a radio comes up at block 146 (i.e., radio of the mobile device transitions from a low power state to a high power state or from an idle state to a connected state) for other reasons (e.g., detection of user-interactive traffic, data from a remote server) after period X1, the keepalive optimizer identifies the latest keepalive transaction a block 147 and sends the keepalive 149 to the network 106.

The delay keeps both the application and server connections healthy and allows for delaying keepalives up to time period X2. By way of example, for applications such as SKYPE, the delay can be as long as 10 seconds, and for applications based on Google Cloud Messaging (GCM), the delay can be as long as 60 seconds. Extending of the keepalive period or interval as described herein is beneficial with or without alignment between different applications. For example, keepalive period of multiple applications can be extended by different amounts so that all the keepalives can be sent when the radio of the mobile device comes up. The period X1 or pattern Z and period X2 for the application Y can be determined based on offline analysis of the application behavior. The offline analysis can be performed on the mobile device 150 or a proxy server (e.g., proxy server 125) associated with a host server (e.g., host server 100).

In one embodiment, signaling in a wireless network can be optimized by delaying certain types of traffic under certain conditions. FIG. 1A-4 is an example schematic diagram that depicts optimization of background traffic by delaying repeatable background requests on the mobile device 150.

Background traffic generated when an application is in the background and when the radio is down can be delayed. Such traffic can be delayed until the radio is observed or detected to come up, or until the known application tolerance is about to expire (e.g., 2 minute grace period). The background traffic that is delayed can include different request types (e.g., log uploads, status updates) as well as keepalive traffic. In one embodiment, application tolerance is defined as the shorter of the longest period during which the application will not display an error message to the user and the longest period beyond which the application will stop retrying the connection.

In some instances, different tolerances for different request types can be identified in determining the length of delay. For example, "log upload" request type is typically retried for long periods of time, so it will have a longer tolerance compared to another request type (e.g., status update). In one embodiment, delaying background requests according to the tolerance can be more advantageous than normalizing the delay, as the latter can cause the server to start polling the application for log uploads. In one embodiment, delaying certain types of traffic under certain conditions can be generalized beyond per-transaction handling to per-application handling. For example, any background requests from an application can be delayed the same amount of time, regardless of the background request type. In one embodiment, delay of background requests can be configured using a policy In one embodiment, the background request can be a repeatable background request, where the application itself has logic to recover from an unsuccessful transaction. This recovery logic can be exploited by the keepalive optimizer to cause background requests to fail on purpose, and force the application to use the retry logic on the application layer to eventually execute the background request after a time delay. An example implementation of delaying background traffic for an application (e.g., FACEBOOK) by the keepalive optimizer will now be described. It should be noted that the keepalive optimizer can be the application itself (in this example the FACEBOOK) or a local proxy (e.g., local proxy 175).

In one embodiment, traffic patterns associated with an application can be learned or observed during a learning period. From the observation, it may be determined that the application resends the same request immediately when a request does not get a response within a specific time (e.g., 1 minute, 5 minutes). For example, background requests 1 and 2 shown in FIG. 1A-4 are retried after $T_{retry\text{-}1}$ and $T_{retry\text{-}2}$ respectively when no response is received from the network. Based on this observation or information, the keepalive optimizer intercepts and delays the background requests for a specific time (configurable via a policy management system (PMS)) until a trigger in the form of an event is detected.

In the example FIG. 1A-4, the background requests 1 and 2 are intercepted at block 160 when certain conditions are met. If the background requests 1 and 2 are of different type, a separate delay timer can be started for each of the request. For example, a delay timer for background request 1 is started at block 162 for a period of $T_{delay\text{-}1}$ and an independent delay timer for background request 2 is started at block 164 for a period of $T_{delay\text{-}2}$. At block 166, the keepalive optimizer can detect an undelay trigger for undelaying background request 1 and can then transmit background request 1 to the network 106. Similarly, the keepalive optimizer can detect an undelay trigger for background request 2 at block 170 and transmit background request 2 to the network 106.

In one embodiment, intercepting and delaying of the background requests occur under certain conditions. For example, a missed request, which is not able to be served from a cache with existing logic, is entered into a delay mode if the following example conditions are satisfied:
a) the device is on mobile network;
b) the device is not in the transparent mode (i.e., a measure only or observation only mode, that does not affect the traffic flow);
c) the device screen is off;
d) the device radio is off; and
e) the feature is enabled by the Policy Management System (PMS).

Similarly, the undelaying of the request (or exit from delay mode) can be triggered when at least one of the conditions below is satisfied:
a) the screen is on;
b) the radio is up;
c) network switched to Wi-Fi;
d) delay timer is expired;
e) PMS is disabled; and/or
f) device switch to transparent mode.

In one embodiment, when the background request first gets delayed, the keepalive optimizer immediately schedules a timer to indicate a delay cycle has started. During the delay cycle, any new background requests from the application are delayed until an undelay event (or an event that causes an exit from delay mode) is triggered. If there is no trigger other than delay timer, the keepalive optimizer allows the very first background request after the delay timer expiration to go out to the network. On the other hand, any other trigger events can cancel the scheduled delay timer. When the trigger for undelay is fired, the keepalive optimizer goes through all the application requests in the delay mode and forces their execution immediately.

In one embodiment, the keepalive optimizer can allow some background transactions to time out, in case the application associated with the background transaction is observed to retry the same transaction without impact to functionality or end user experience. In such a case, the starting point of the timer (or counter) for the delay is the same for the first background request and the subsequent background requests. Alternately, as described with respect to FIG. 1A-4, a separate timer can be started separately for each background request.

In one embodiment, the keepalive optimizer can delay background traffic, even if the same session (e.g., TCP socket) includes user-interactive traffic, or background traffic that has shorter tolerance for delays (e.g., if $T_{delay\text{-}1}$ and $T_{delay\text{-}2}$ in FIG. 1A-4 are different). This allows the keepalive optimizer to delay each transaction for a maximum amount that it has tolerance for, for example, by not sending out the longer-tolerance traffic if a shorter-tolerance traffic needs to go out.

In one embodiment, in order to delay the background requests, DNS requests can be cached to prevent a DNS request from turning on the radio of the mobile device. In one embodiment, the hosts to which an application makes the request can be identified and cached to facilitate background requests to be delayed.

In one embodiment, the PMS can be configured to enable or disable delaying of background requests and/or how long the delay cycle will be applied. A default value can also be specified (e.g., 300,000 ms, 300 s, 5 minutes). In one embodiment, the keepalive optimizer can report data on request delay value (i.e., how long the request was delayed by the delay timer) and radio awareness status when a delayed transaction was sent to a server (e.g., application server, proxy or host server). The request delay value can be the amount of time (e.g., milliseconds) between the Cache Lookup Query (CLQ) and a cache miss or error (i.e., MISS or ERR) response in one embodiment. The radio awareness status may be:

0—the transaction was not radio-aware and was not delayed;
1—the transaction was radio-aware and was released due to a radio up event;
2—the transaction was radio-aware but was released due to the timer expiration;
3—the transaction was radio-aware but was released due to a screen on event;
4—the transaction was radio-aware but was interrupted abnormally by the keepalive optimizer, application or local proxy (typically due to a timeout).

Figures 1, 1A, 2, 3, 4:
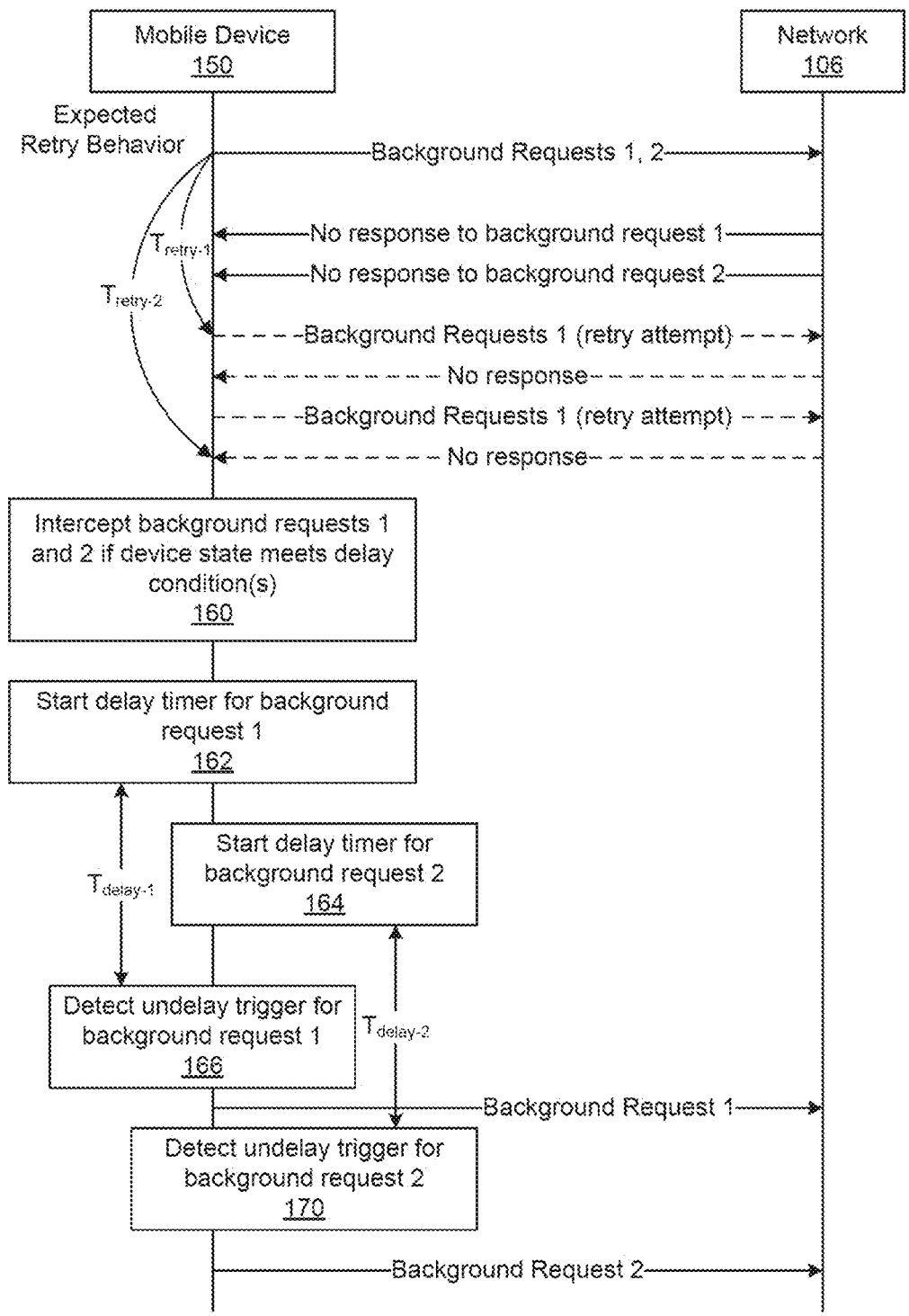
Figures 1, 1A, 2, 3, 4, 5:
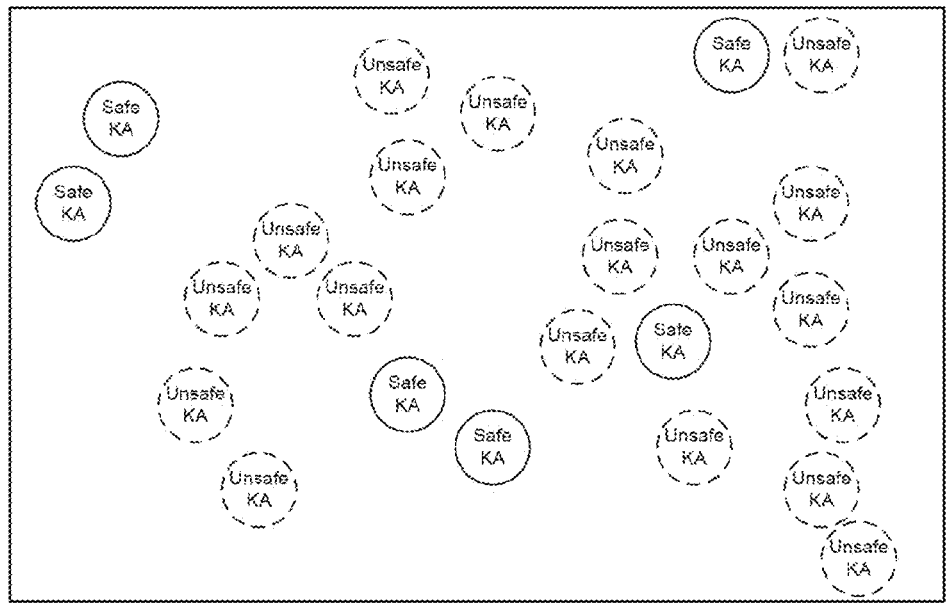
Figures 1, 1A, 2, 3, 4, 5, 6:
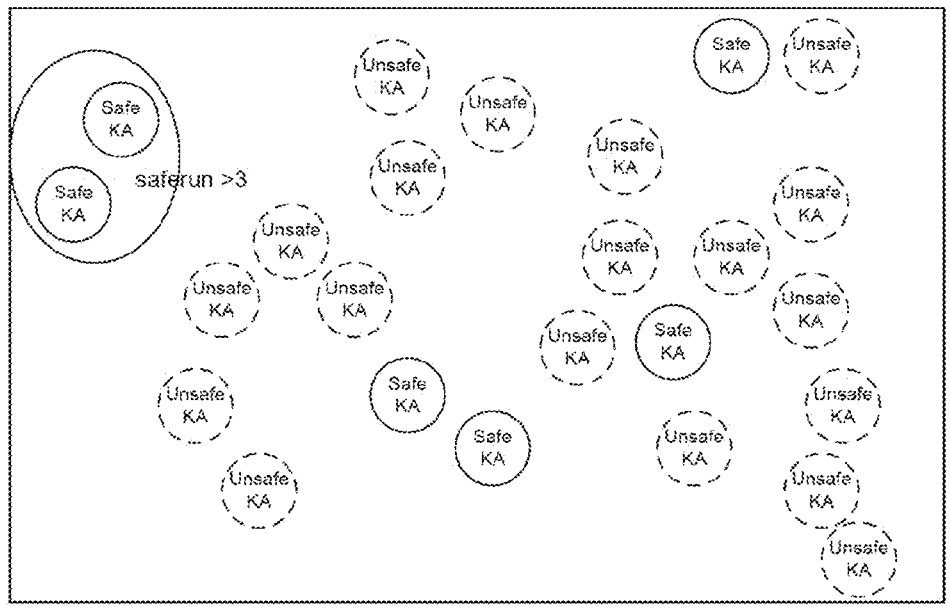
Figures 1, 1A, 2, 3, 4, 5, 6, 7:
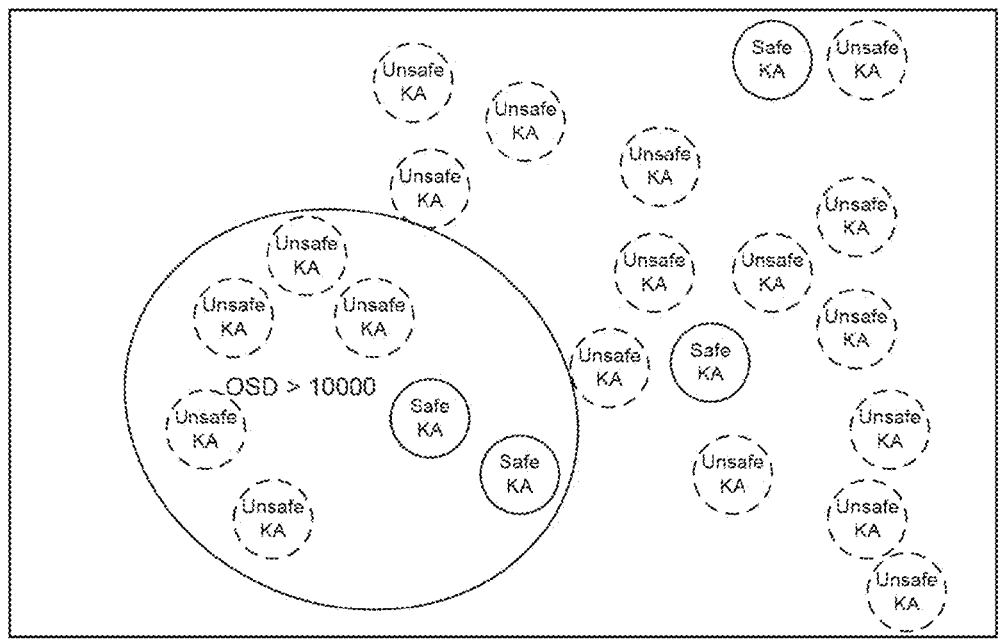
Figures 1, 1A, 2, 3, 4, 5, 6, 7, 8:
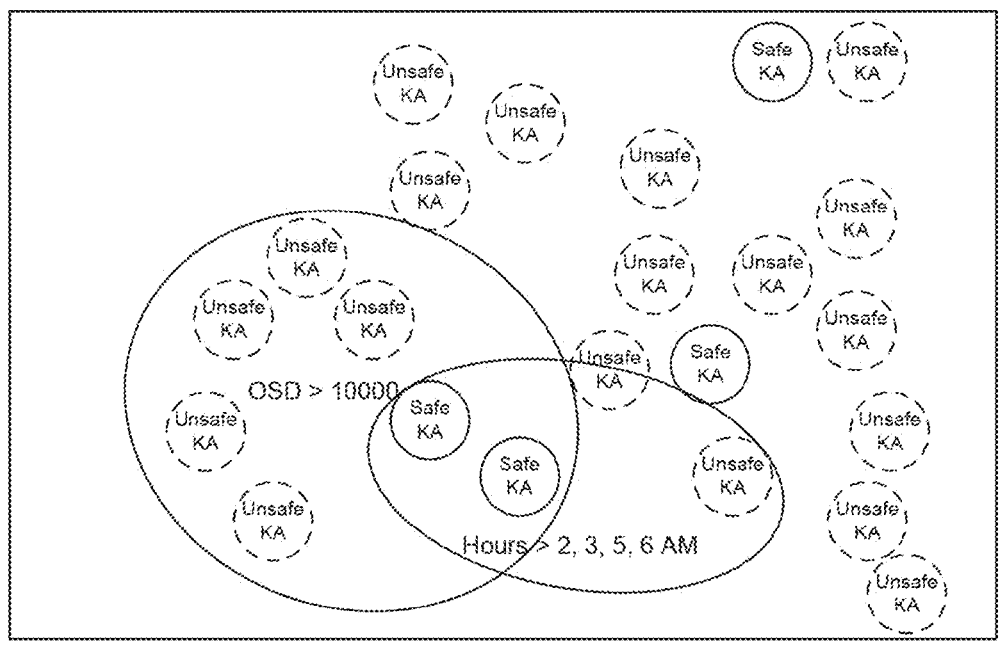
Figures 1, 1A, 2, 3, 4, 5, 6, 7, 8, 9:
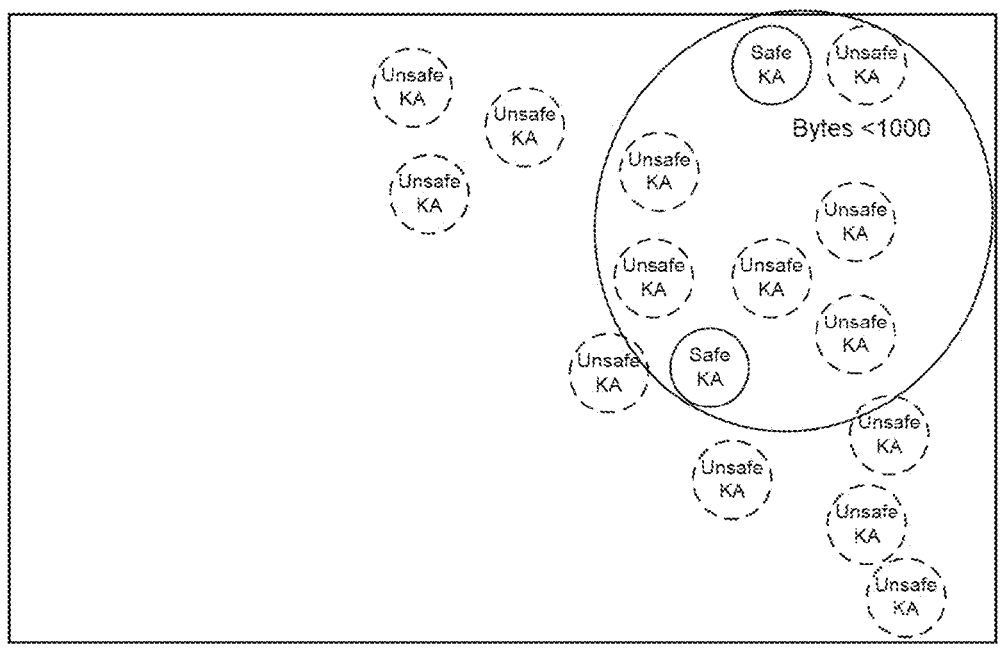
Figure 1B:
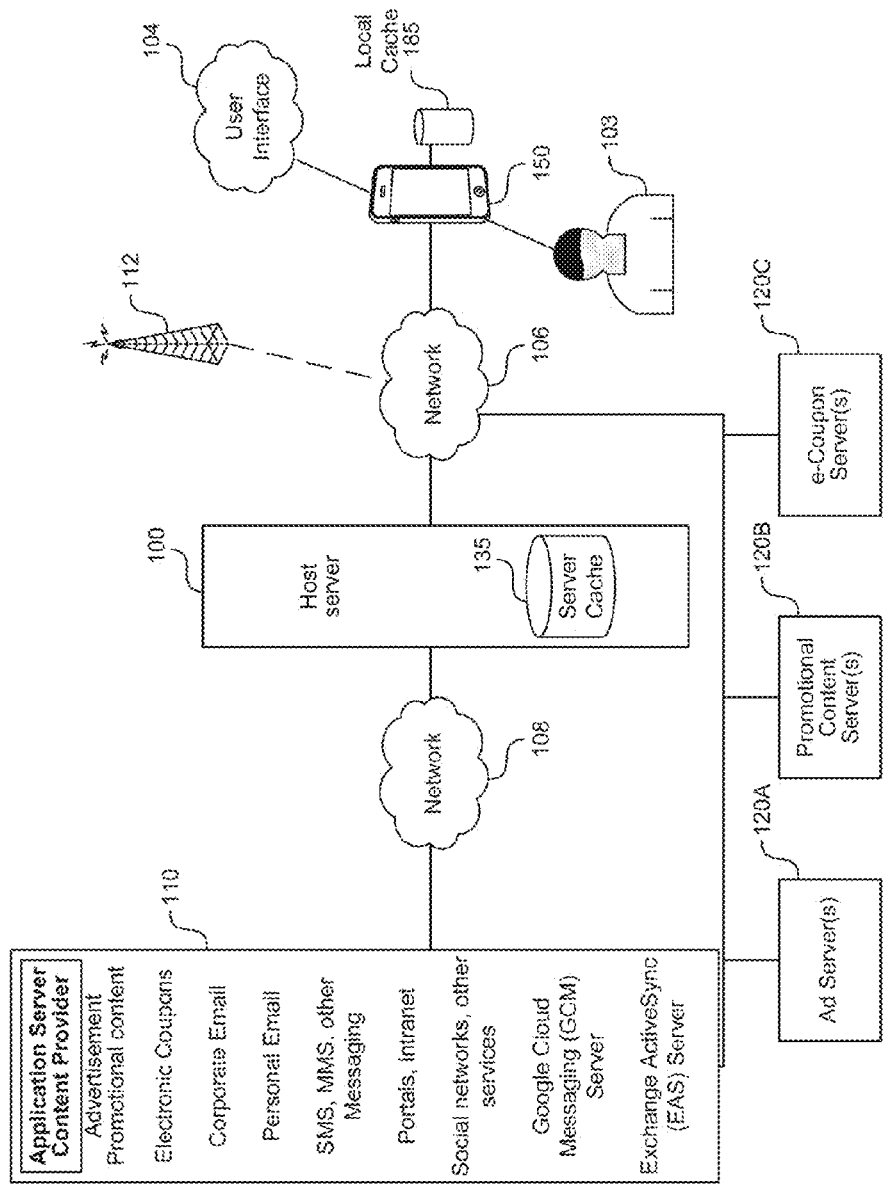
FIG. 1B illustrates an example diagram of a system where a host server facilitates management of traffic including keepalive and other background traffic, content caching, and/or resource conservation between mobile devices (e.g., wireless devices), an application server or content provider, or other servers such as an ad server, promotional content server, or an e-Coupon server in a wireless network (or broadband network) for resource conservation.

FIG. 1B illustrates an example diagram of a system where a host server facilitates management of traffic, content caching, and/or resource conservation between mobile devices (e.g., wireless devices), an application server or content provider, or other servers such as an ad server, promotional content server, an e-coupon server or messaging servers such as the Google Cloud Messaging (GCM) server and the Exchange ActiveSync (EAS) server in a wireless network (or broadband network) for resource conservation. The host server can further optimize signaling in a wireless network for traffic utilizing proprietary (non-standard) and nonproprietary (e.g., HTTP) protocols.

The GCM server allows transfer of data from an application server or content provider to user devices using XMPP (upstream and downstream i.e., device to cloud and cloud to device). The GCM server can queue messages and deliver the messages to the target applications on the user device. These messages can inform the mobile application that there is new data to be fetched from the content provider or application server and/or can include actual data (e.g., instant messages). The EAS server allows for wireless synchronization of emails, calendars, contacts, and the like between an exchange server and a mobile device using an XML based protocol over HTTP or HTTPS. Various other intermediary or messaging servers that facilitate communication between applications on client devices and content provider or application servers are contemplated.

The client devices 150 can be any system and/or device, and/or any combination of devices/systems that is able to establish a connection, including wired, wireless, cellular connections with another device, a base station/cell provider 112, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can be any server including third party servers or service/content providers further including advertisement, promotional content, publication, or electronic coupon servers or services. Similarly, separate advertisement servers 120*a*, promotional content servers 120*b*, and/or e-Coupon servers 120*c* as application servers or content providers are illustrated by way of example.

For example, the client/mobile devices 150 can include mobile, handheld or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanisms, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests (e.g., via user interface 104) and/or device/application maintenance tasks. The traffic can be managed such that network consumption (e.g., use of the cellular network) is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the device 150 can observe user activity (for example, by observing user keystrokes, backlight status, or other signals via one or more input mechanisms, etc.) and alter device 150 behaviors. The device 150 can also request the host server 100 to alter the behavior for network resource consumption based on user activity or behavior.

In one embodiment, the traffic management for resource conservation and/or keepalive optimization/algorithms for signaling optimization is performed using a distributed system between the host server 100 and client device 150. The distributed system can include proxy server and cache components on the server side 100 and on the device/client side, for example, as shown by the server cache 135 on the server 100 side and the local cache 185 on the client 150 side. In one embodiment, the traffic management for reducing signaling in the network and reducing or alleviating network congestion can be implemented on the mobile device 150 without any support from the server-side proxy or other network-side components.

Functions and techniques disclosed for context aware traffic management and keepalive algorithms for resource conservation and reducing or optimizing signaling in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C. Functions and techniques performed by the proxy and cache components in the client device 150 and the related components therein are described, respectively, in detail with further reference to the examples of FIG. 2A.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote login, email, news, RSS, cloud-based services, instant messaging, visual voicemail, push mail, VoIP, and other services through any known or convenient protocol, such as, but not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by an open network, such as the Internet, or a private network or broadband network, such as an intranet and/or the extranet. In one embodiment, communications can be achieved by a secure communications protocol, such as secure sockets layer (SSL) or transport layer security (TLS).

In addition, communications can be achieved via one or more networks, such as, but not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS-based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
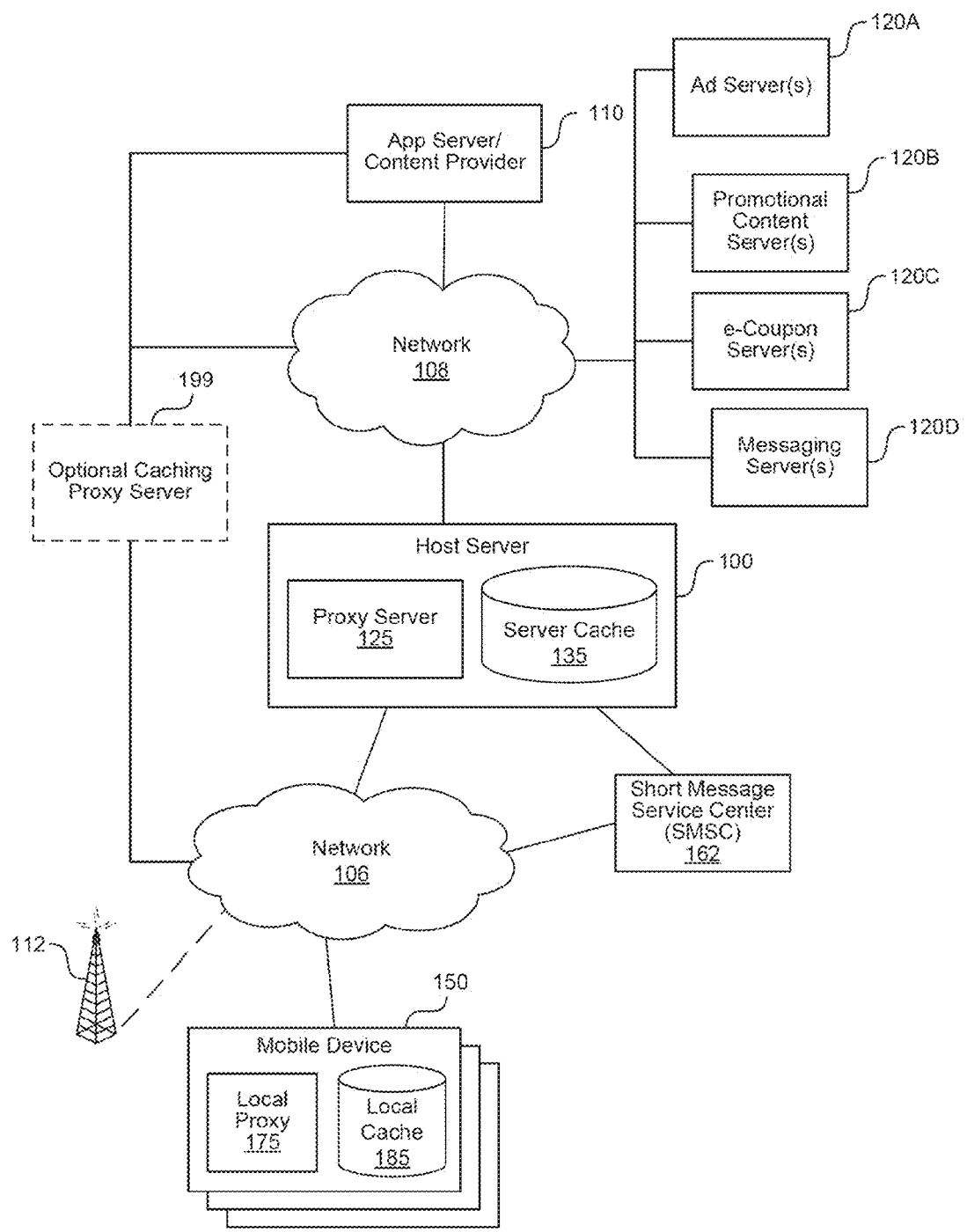
FIG. 1C illustrates an example diagram of a proxy and cache system distributed between the host server and a mobile device which facilitates network traffic management between the mobile device, an application server or content provider, or other servers such as an ad server, promotional content server, or an e-Coupon server for resource conservation and content caching.

FIG. 1C illustrates an example diagram of a proxy and cache system distributed between the host server and device which facilitates network traffic management between a device, an application server or content provider, or other servers such as an ad server, promotional content server, an e-coupon server or messaging servers such as the GCM server and the EAS server for resource conservation and content caching. The proxy system distributed among the host server and the device can further optimize signaling in a wireless network for traffic utilizing proprietary (non-standard) and nonproprietary (e.g., HTTP) protocols.

The distributed proxy and cache system can include, for example, the proxy server 125 (e.g., remote proxy) and the server cache 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache 135 is external to the host server 100. In addition, each of the proxy server 125 and the server cache 135 may be partially internal to the host server 100 and partially external to the host server 100. The application server/content provider 110 can be any server including third-party servers or service/content providers further including advertisement, promotional content, publication, or electronic coupon servers or services. Similarly, separate advertisement servers 120A, promotional content servers 120B, e-Coupon servers 120C, and/or messaging servers (e.g., GCM, EAS servers) 120D as application servers or content providers are illustrated by way of example.

The distributed system can also include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider (e.g., 112), and or any combination of the above to facilitate network traffic management for network and device resource conservation. Proxy server 199 can be used, for example, for caching content to be provided to the device 150, for example, from one or more of, the application server/provider 110, host server 100, and/or a network service provider. Content caching can also be entirely or partially performed by the remote proxy 125 to satisfy application requests or other data requests at the device 150.

In context-aware traffic management and optimization for resource conservation and/or keepalive optimization in signaling optimization in a network (e.g., cellular or other wireless networks), characteristics of user activity/behavior and/or application behavior at a mobile device (e.g., any wireless device) 150 can be tracked by the local proxy 175 and communicated over the network 106 to the proxy server 125 component in the host server 100, for example, as connection metadata. The proxy server 125, which in turn is coupled to the application server/provider 110, provides content and data to satisfy requests made at the device 150. The local proxy 175 can be a protocol-agnostic component that can identify a pattern within a byte stream and perform a direct replay of the binary transactions in one embodiment. In another embodiment, the local proxy 175 can optimize keepalives for signaling optimization in a wireless network utilizing proprietary and/or nonproprietary protocols.

In addition, the local proxy 175 can identify and retrieve mobile device properties, including one or more of battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2A.

The local cache 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 162, such as that provided by the network service provider, in communicating with the device 150 in achieving network traffic management. Note that SMSC 162 can also utilize any other type of alternative channel including USSD or other network control mechanisms. The host server 100 can forward content or HTTP responses to the SMSC 162 such that it is automatically forwarded to the device 150 if available and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously. Furthermore, by preventing the mobile device from constantly attempting to signal the network that is congested, and/or allowing selective (e.g., high priority) traffic towards the network, the local proxy 175 can conserve battery resources of the mobile device.

Figure 1D:
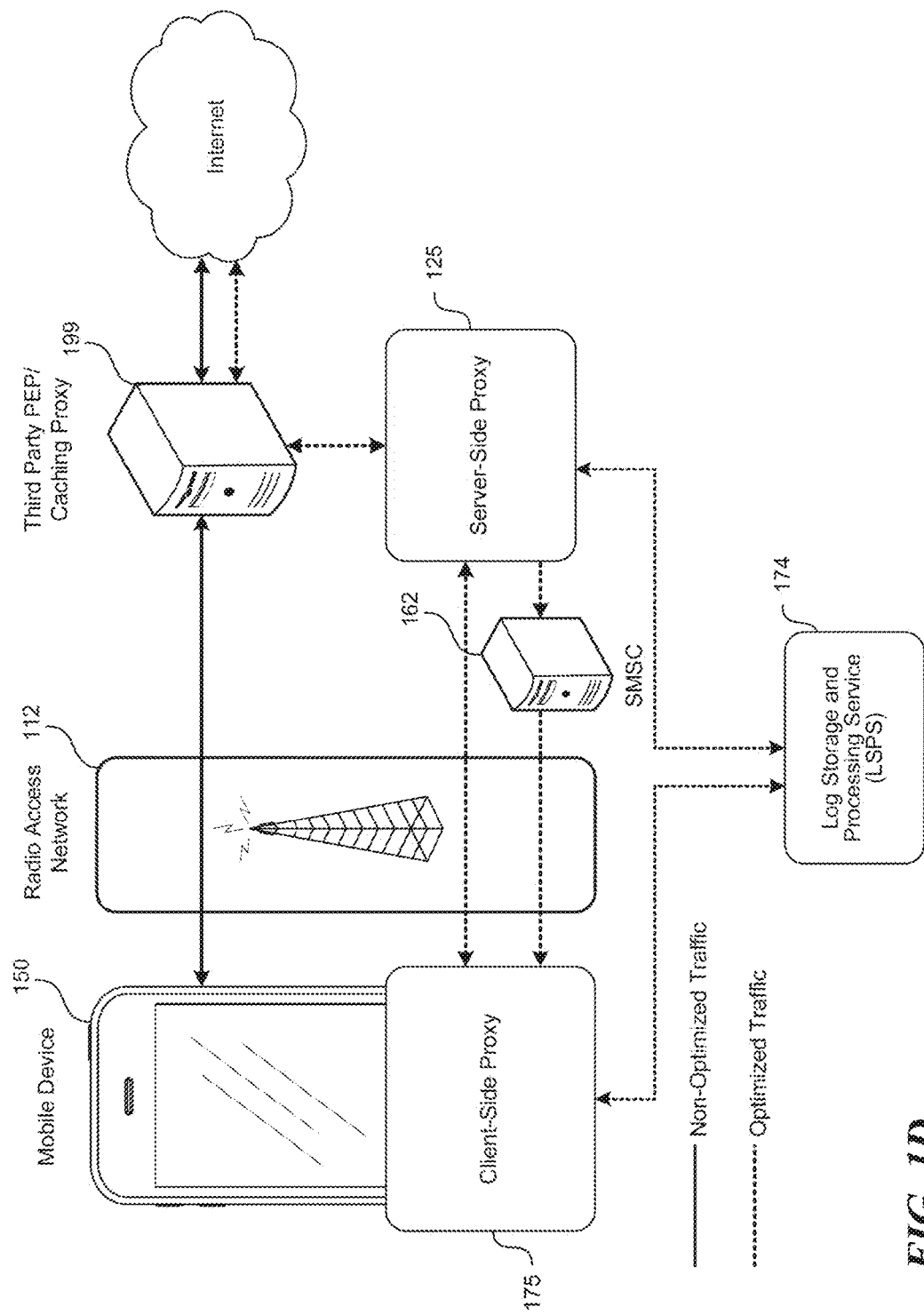
FIG. 1D illustrates an example diagram of the logical architecture of a distributed proxy and cache system, including a log storage and processing service.

FIG. 1D illustrates an example diagram of the logical architecture of a distributed proxy and cache system. The distributed system can include, for example the following components:

Client Side Proxy 175: a component installed in a smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIG. 2A.

The server side proxy 125 can include one or more servers that can interface with third-party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third-party servers. In one embodiment, the server-side proxy 125 can utilize the store and forward functions of a short message service center (SMSC) 162 in communicating with the client-side proxy 175 on the mobile device 150 to optimize network traffic.

Log Storage and Processing Service (LSPS) 174: The log storage and processing service, server, system or component 174 can provide reporting and usage analytics services. The LSPS 174 can collect information (e.g., logs) from the client side 175 and/or the server side 125 and provide the necessary tools for producing reports and usage analytics that can be used for analyzing traffic and signaling data. The client logs (e.g., logs on the client device 150 aggregated by the local proxy 175) are stored in the device until a data channel is activated, and they are then transferred in binary format to the LSPS 174. In one embodiment, the logs are processed using log processing tools provided by the LSPS 174. The processed logs are subsequently stored in a distributed database. The logs may be used for reporting as well as for troubleshooting issues. For example, analytics from the logs can be used by the proxy system in managing, reducing or optimizing network traffic or by the network operator in monitoring their networks for possible improvements and enhancements. Note that LSPS 174 as illustrated may be a server separate from the server-side proxy 125, or it may be a component of the server-side proxy 125, residing partially or wholly therein.

In one implementation, the level of logging (e.g., types of data to be logged, and the like) can be specified using configuration settings in the client-side proxy 175 and/or the server-side proxy 125. Various data relating to bytes and transactions, network connectivity, power, subscriber count, and the like may be logged, and/or processed using default (or other) settings on a periodic (e.g., hourly, daily, and the like) basis.

Bytes and Transactions data may include a number of bytes transacted (both to and from), the total number of transactions between the client-side proxy 175 and each application, the client-side proxy 175 and the network (e.g., radio access network 112), the client-side proxy 175 and its cache, and the like. Network Connectivity data may include, for example, total time the device spends in "data connected" state (based on a two-state connectivity model), total number of transitions into the data connected state, the number of times the radio transitions into the data connected state due to a network request that was proxied through the client-side proxy 175, total time spent in the data connected state due to a network request that was proxied through the client-side proxy 175, the number of transitions into data connected mode saved by the client-side and/or server-side proxy system, the amount of time in data connected state saved by the client-side and/or server-side proxy system, simulated values for the previous four items, as if traffic proxied via client-side and/or server-side proxy system were the only traffic on the device. Network connectivity data can also include the amount of time taken to transition from an idle state to connected state (i.e., setup time), a baseline or a reference determined from a sample of setup times, and the like. Power-related data may include, for example, each one-percent (or any other percentage value) change in the battery level, the total time the device is powered on but not connected to a power source, and the like. Subscriber count data may include, for example, the number of new subscribers observed in a period and the number of active subscribers in the period. This data may be aggregated by the host server, for example. Reporting of the above data can be done based on variables such as network bearer type (e.g., all, mobile or Wi-Fi), category (e.g., all, device model or application name), time (e.g., hour, day or month), and the like, or combinations thereof.

Figure 1E:
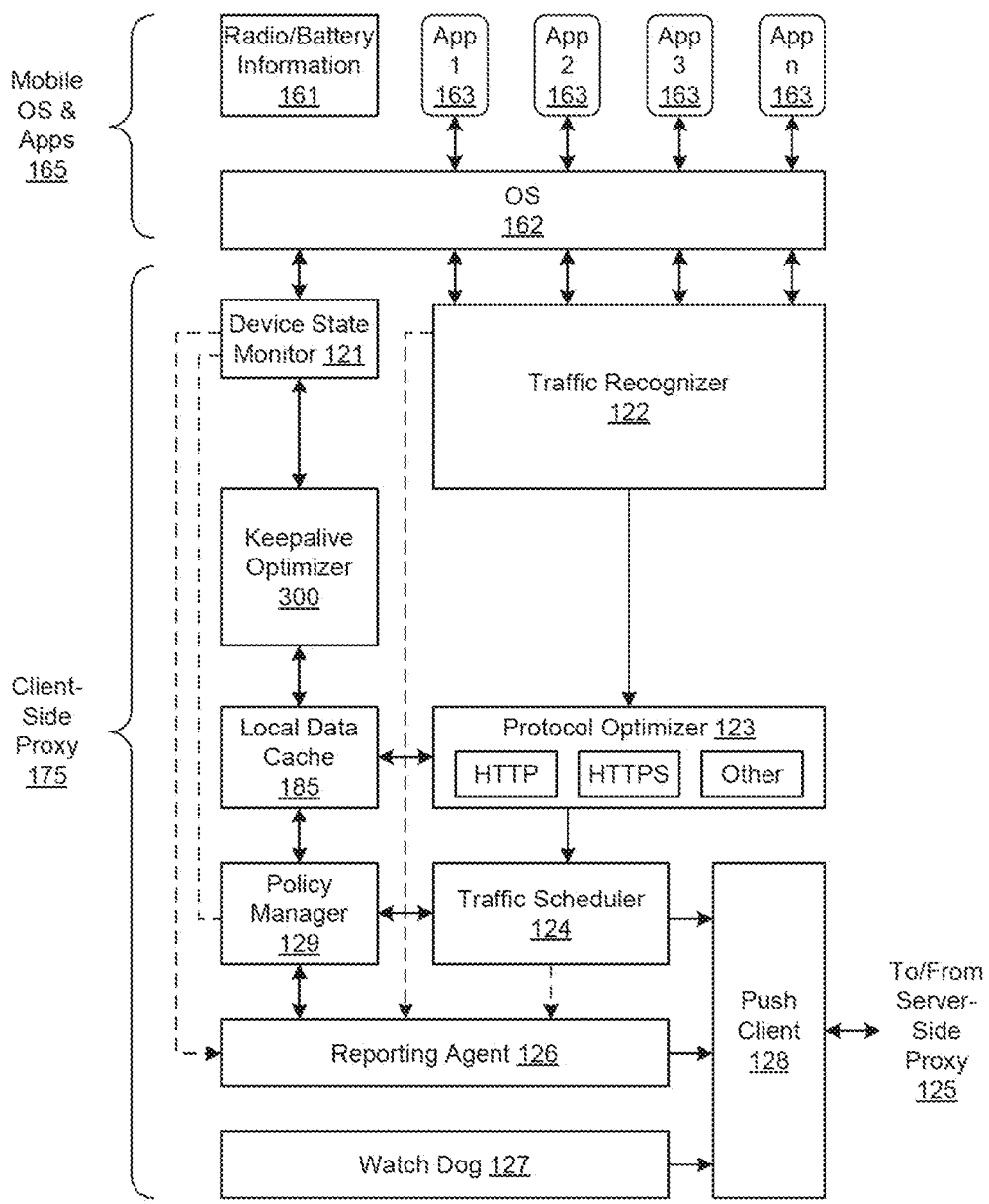
FIG. 1E illustrates an example diagram showing the architecture of client side components in a distributed proxy and cache system, including a keepalive optimizer.

FIG. 1E illustrates an example diagram showing the architecture of client-side components in a distributed proxy and cache system having a keepalive optimizer for optimizing keepalive and other background traffic in a wireless network.

The client-side proxy 175 components can include software components or agents installed on the mobile device that enable traffic optimization and perform the related functionalities on the client side. Mobile OS and Apps 165 include components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status (e.g., radio on/off status, connected to Wi-Fi, 2G, 3G or other mobile network), display status, battery level (e.g., via the radio/battery information 161), transparent mode status, etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent requests from the local cache 185 instead of allowing those request go over the network to the service provider/application host server. One of its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keepalive signaling so that some or all of the different applications 163 can send keepalive messages at the same time (traffic pipelining). Traffic scheduler 124 may also decide to delay transmission of data that is not relevant at a given time (for example, when the device is not actively used).

The keepalive optimizer 300: The keepalive optimizer 300 can optimize keepalive and other non-user interactive or background traffic using various methodologies. In one embodiment, the keepalive optimizer 300 can improve the efficiency of keepalive transactions and manage long-lived connections between mobile applications and associated application/host servers. For example, the keepalive optimizer 300 can manage long-lived connections with fewer keepalives, utilize radio-awareness, application behavior and/or device state to schedule transmission of keepalives and other background traffic, and the like. By performing these optimizations, the keepalive optimizer 300 can reduce unnecessary traffic in the mobile network, reduce battery resource consumption on mobile devices, save on bandwidth resource consumption and manage long-lived connections among others. Various aspects of the keepalive optimizer 300 are described in detail in FIG. 3A.

Policy Manager 129: The policy manager 129 can store and enforce traffic optimization and reporting policies provisioned by a Policy Management Server (PMS). At the client side proxy 175 first start, traffic optimization and reporting policies (policy profiles) that are to be enforced in a particular device can be provisioned by the Policy Management Server. Enforcing traffic management policies at the device's IP layer lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy, may be managed or coordinated by the policy manager 129. For example, in some embodiments, the policy manager 129 can manage and implement keepalive and other background traffic optimization policies such as blocking policies, delaying policies, transmission policies, and/or the like configured and provisioned by the PMS. For example, the PMS can have two policy configurations for optimizing background requests: (1) true to enable the optimization and false to disable the optimization and (2) length of delay cycle to be applied if there is no other event triggering undelay. Similarly, the PMS can provide and the policy manager 129 can implement other configurations for various components of the keepalive optimizer 300. In one embodiment, the policy manager 129 can receive and implement a policy configuration from the PMS to enable or disable the keepalive optimizer 300 at an application level or at a user or device level.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and send the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server (PMS). The information in the logs may be used for reporting and/or troubleshooting, for example.

Push Client 128: The push client 128 can be responsible for the traffic between the server side proxy 125 and the client side proxy 175. The push client 128 can send out service requests like content update requests and policy update requests, and can receive updates to those requests from the server side proxy 125. In addition, push client 128 can send data to a log storage and processing service 174, which may be internal to or external to the server side proxy 125.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 2A:
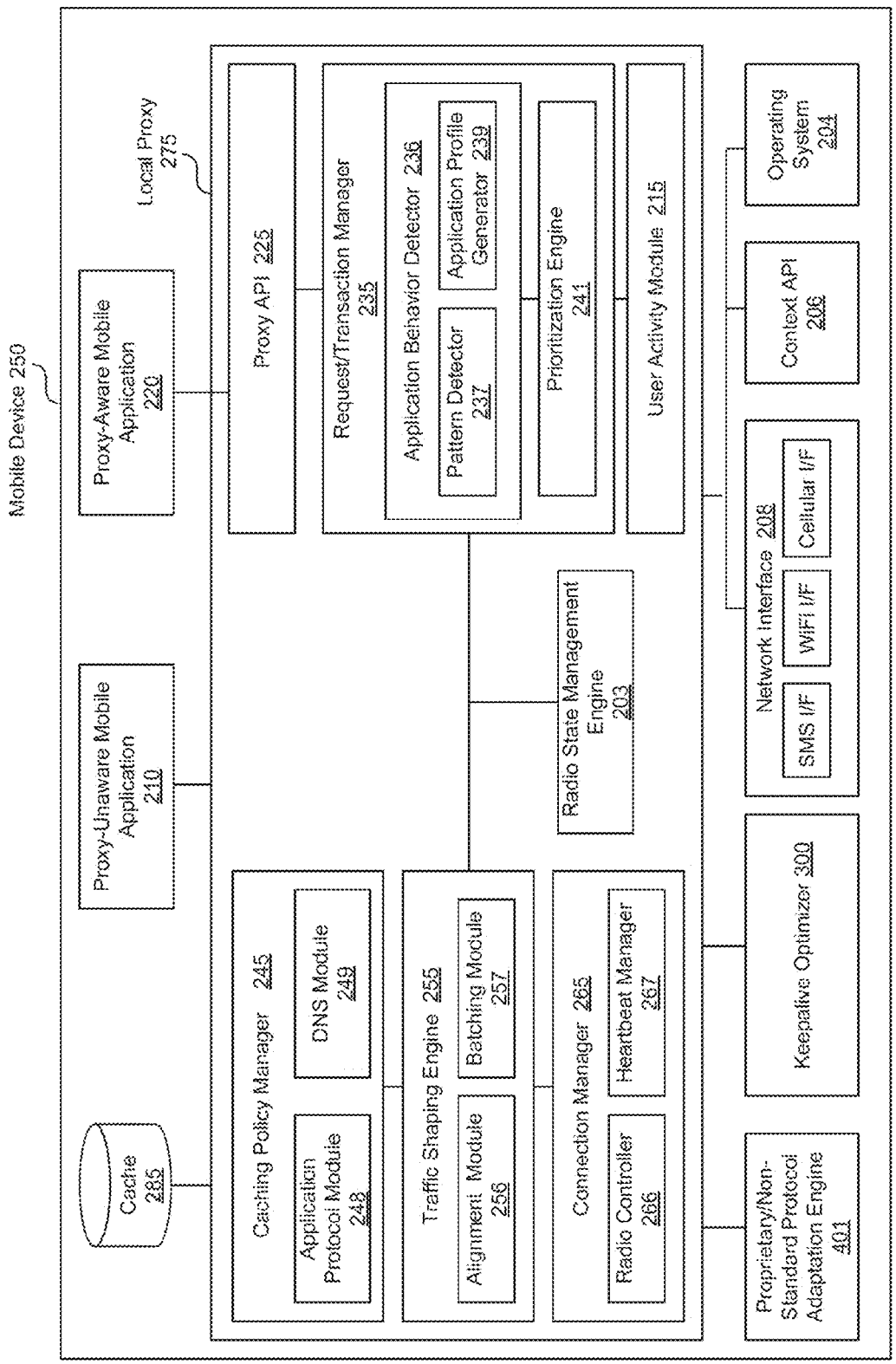
FIG. 2A illustrates an example diagram depicting an example of client-side components in a distributed proxy and cache system and a keepalive optimizer.
Figure 2B:
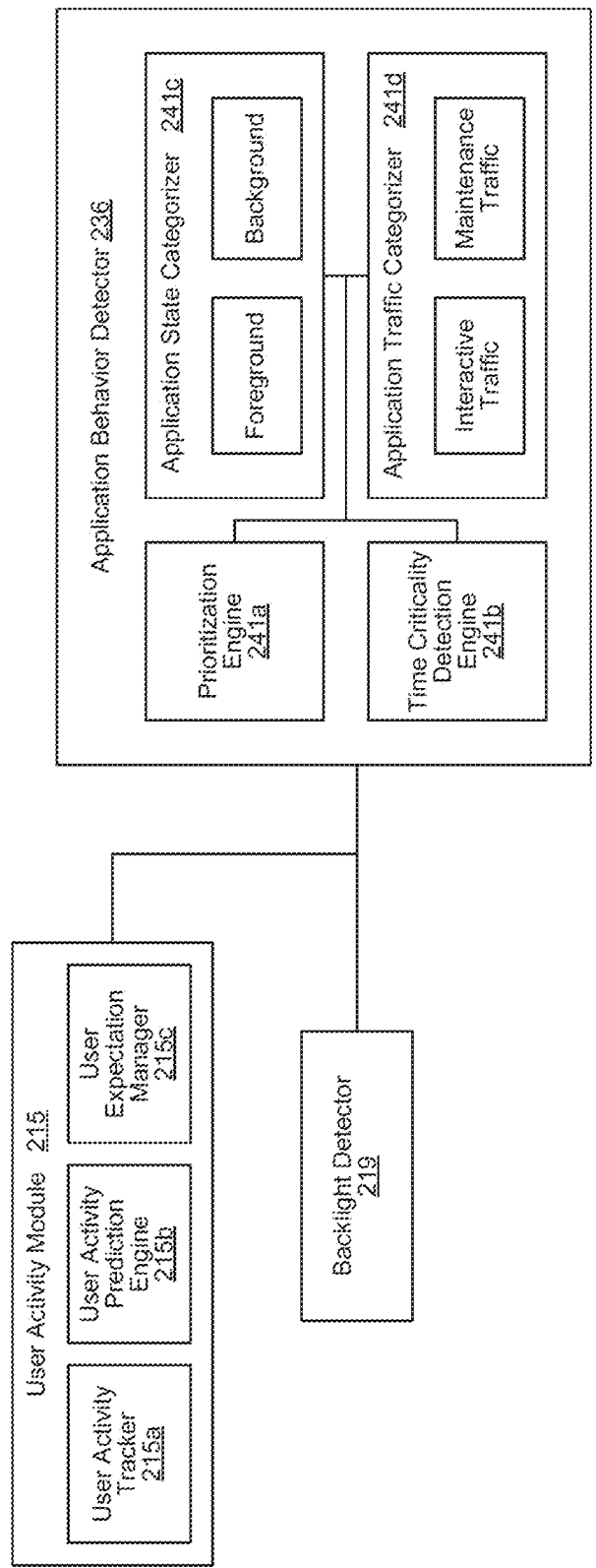
FIG. 2B illustrates an example diagram depicting additional client-side components in the distributed proxy and cache system of FIG. 2A.

FIG. 2A depicts a block diagram illustrating another example of client-side components in a distributed proxy and cache system, further including a proprietary/non-standard protocol adaptation engine and a keepalive optimizer. The client-side components in a distributed proxy and cache system can reside on a mobile device (e.g., wireless device) 250 that manages traffic in a wireless network (or broadband network) for keepalive optimization, signaling optimization, resource conservation, content caching, and/or traffic management. FIG. 2B depicts a block diagram illustrating examples of additional components shown in the example of FIG. 2A which is further capable of performing mobile traffic categorization and management based on application behavior and/or user activity.

The mobile device 250, which can be a device that is portable or mobile (e.g., any wireless device), such as a portable phone, generally includes, for example, a network interface 208, an operating system 204, a context API 206, and mobile applications which may be proxy-unaware 210 or proxy-aware 220. Note that while the client device 250 is specifically illustrated in the example of FIG. 2A as a mobile device, such depiction is not a limitation, and mobile device 250 may be any wireless, broadband, portable/mobile or non-portable device able to receive and/or transmit signals to satisfy data requests over a network including wired or wireless networks (e.g., Wi-Fi, cellular, Bluetooth, LAN, WAN, and the like).

The network interface 208 can be a networking module that enables the device 250 to mediate data in a network with an entity that is external to the mobile device 250, through any known and/or convenient communications protocol supported by the mobile device and the external entity. The network interface 208 can include one or more of a network adaptor card, a wireless network interface card (e.g., SMS interface, Wi-Fi interface, interfaces for various generations of mobile communication standards including but not limited to 2G, 3G, 3.5G, 4G, LTE, etc.), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device)

and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266, a heartbeat manager 267 and a keepalive optimizer 300. The request/transaction manager 235 can further include an application behavior detector 236 having a prioritization engine 241, a pattern detector 237, an application profile generator 239, a time criticality detection engine 242, an application state categorizer 243 and an application traffic categorizer 244. In one embodiment, the local proxy or the device can further include a proprietary/non-standard protocol adaptation engine 401 for optimizing traffic in a protocol agnostic manner.

Additional or less components/modules/engines can be included in the local proxy 275 and each illustrated component.

As used herein, a "module," "manager," "handler," "detector," "optimizer," "interface," "controller," "normalizer," "generator," "invalidator," or "engine" includes a general purpose, dedicated or shared processor and, typically, firmware or software modules that are executed by the processor. Depending upon implementation-specific or other considerations, the module, manager, handler, detector, optimizer, interface, controller, normalizer, generator, invalidator, or engine can be centralized or its functionality distributed. The module, manager, handler, detector, optimizer, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for mobile traffic management resides in or is in communication with the mobile device 250, including local proxy 275 (mobile client) and/or cache 285. The local proxy 275 can provide an interface on the mobile device 250 for users to access device applications and services including email, IM, voice mail, visual voicemail, feeds, Internet, games, productivity tools, or other applications, etc.

The local proxy 275 is generally application independent and can be used by applications (e.g., both proxy-aware and proxy-unaware applications 210 and 220 and other mobile applications) to open TCP (Transport Control Protocol) or other protocol based connections to a remote server (e.g., the server 100 in the examples of FIG. 1B-1C and/or server proxy 125 shown in the examples of FIG. 1B). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, and the like. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the mobile device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power, and/or further optimize signaling in the network. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 in the examples of FIG. 1B-1C) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 or the network-side proxy 125 in the examples of FIG. 1B-1C) send the data that was buffered as a result of the previously decreased communication frequency.

In addition, or in alternative, the local proxy 275 can communicate the characteristics of user activity at the device 250 to the remote device (e.g., host server 100 or the network-side proxy 125 in the examples of FIG. 1B-1C) and the remote device determines how to alter its own communication frequency with the device 250 for network resource conservation and conservation of resources of the mobile device 250.

One embodiment of the local proxy 275 further includes a request/transaction manager 235, which can detect, identify, intercept, process and manage data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265 can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or additionally be set by the particular application; for example, the Facebook application (e.g., a mobile application) can set its own priorities for various transactions (e.g., a status update can be of higher priority than an add friend request or a poke request; a message send request can be of higher priority than a message delete request), or an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user can in general set priorities at different tiers, such as, specific priorities for sessions, or types, or applications (e.g., comparing a browsing session, a gaming session, and an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE 3

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Severe Weather Alerts | High |
| Weather Updates | Low | News Updates | Low |

Table 3 above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include updating message status as being read, unread, deleting of messages, deletion of contacts; higher priority requests/transactions can, in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages) are generally considered low priority and, absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate deletion of the message from the device 250 the moment that the message has exceeded 7 days old, the message is deleted when the radio is powered on next. If the radio is already on, then pruning may occur as regularly scheduled.

The request/transaction manager 235 can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such that a request can be sent when a request for a transaction is detected to be over a certain priority level.

In one embodiment, priority assignments (such as that determined by the local proxy 275 or another device/entity) can be used to cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table 3 in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the accumulated low priority events when a higher priority event is initiated or detected at the device 250. Batch transfer can otherwise be initiated when radio use is triggered for another reason (e.g., to receive data from a remote device such as host server 100, server-side proxy 125). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100 as shown in FIG. 1B, the host server 500 as shown in FIG. 5A or a content provider/application server such as the server/provider 110 shown in the examples of FIGS. 1B-1C). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 235 intercepts a data request by an application on the device 250, the local cache repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy 125 of FIG. 4) to determine whether a remotely stored response is valid. If so, the remotely stored response (e.g., which may be stored on the server cache 135 or optional caching server 199 shown in the example of FIG. 1C) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, can send the data request to a remote proxy (e.g., server proxy 125 of FIG. 4) which forwards the data request to a content source (e.g., application server/content provider 110 of FIG. 1B), and a response from the content source can be provided through the remote proxy, as will be further described in the description associated with the example host server 500 of FIG. 4. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 248 of the caching policy manager 245) on the local proxy 275 allows for optimization of any protocol that can be port mapped to a handler in the distributed proxy (e.g., port mapped on the proxy server 125 in the example of FIG. 4).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, and/or monitor applications (e.g., proxy-aware and/or unaware applications 210 and 220) accessed or installed on the device 250. Application behaviors or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead by a proxy server (e.g., proxy server 125 of FIG. 1C) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250 when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded, can notify the device 250.

In one embodiment, the local proxy 275 can mitigate the need/use of periodic keepalive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keepalive) messages being sent from applications.

The heartbeat manager 267 can prevent any or all of these heartbeat messages from being sent over the cellular, or other network, and instead rely on the server component of the distributed proxy system (e.g., shown in FIG. 1C) to generate and send the heartbeat messages to maintain a connection with the backend (e.g., application server/provider 110 in the example of FIG. 1B).

In some embodiments, the radio state management engine 203 can perform the management and/or policy management of mobile device radio state promotion or demotion based on buffer, activity and/or device state monitoring. The radio state management engine 203 can determine what user activity and/or data activity should justify a radio state promotion and communicate the information to the network to be implemented as a single session, multi-session, or global policy. This policy can be used to execute the appropriate level of throttling to prevent the radio from going to higher powered states when unjustified based on dynamic conditions (e.g., network status, traffic, congestion, user expectations, user behavior, other activity, and the like.).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

FIG. 2B illustrates a block diagram depicting additional components in a user activity module and an application behavior detector shown in the example of FIG. 2A.

One embodiment of the local proxy 175 includes the user activity module 215, which further includes one or more of, a user activity detector/tracker 215*a*, a user activity prediction engine 215*b*, and/or a user expectation manager 215*c*. The application behavior detector 236 can further include a prioritization engine 241*a*, a time criticality detection engine 241*b*, an application state categorizer 241*c*, and/or an application traffic categorizer 241*d*. The local proxy 175 can further include a backlight detector 219.

In one embodiment, the application behavior detector 236 may detect, determine, identify, or infer the activity state of an application on the mobile device 250 from which traffic has originated or is directed to, for example, via the application state categorizer 241*c* and/or the application traffic categorizer 241*d*. The activity state can be determined based on whether the application is in a foreground or background state on the mobile device (via the application state categorizer 241*c*) since the traffic for a foreground application versus a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, and the like. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application, and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241*a*) and/or is not time-critical (e.g., by the time criticality detection engine 241*b*).

Contrastingly, a mail 'read' or message 'read' request initiated by a user at the mobile device 250, can be categorized as 'interactive traffic' since the user generally is waiting to access content or data when they request to read a message or mail. Similarly, such a request can be categorized as having higher priority (e.g., by the prioritization engine 241*a*) and/or as being time critical/time sensitive (e.g., by the time criticality detection engine 241*b*).

The time criticality detection engine 241*b* can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as an add-friend or delete-friend request, certain types of messages, or other information which does not frequently change in nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the batching module 257). The alignment module 256 can also align polling requests occurring close in time directed to the same host server, since these requests are likely to be responded to with the same data. In some instances, the timing for withholding or delaying traffic and timing for allowing any delayed or new traffic to the network can be based on traffic management policies.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215*a*. The traffic resulting therefrom can then be categorized appropriately for subsequent processing to determine the policy for handling. Furthermore, user activity can be predicted or anticipated by the user activity prediction engine 215*b*. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215c and/or in conjunction with the activity tracker 215a and/or the prediction engine 215b) to ensure that traffic is categorized appropriately such that user expectations are generally met. For example, a user-initiated action should be analyzed (e.g., by the expectation manager 215c) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standard such as the 3G, 3.5G, 3G+, 4G, or LTE network can be selected for handling traffic generated as a result of user interaction, user activity, or traffic containing data that the user is expecting or waiting for. Advanced generation wireless standard networks can also be selected to transmit data contained in traffic directed to the mobile device which responds to foreground activities.

In categorizing traffic and defining a transmission policy for mobile traffic, a network configuration can be selected for use (e.g., by a network configuration selection engine) on the mobile device 250 in sending traffic between the mobile device and a proxy server and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

In one embodiment, the keepalive optimizer 300 which is described in detail with respect to FIGS. 3A-3D can also detect, identify and intercept keepalives or heartbeat messages and other background traffic using various optimization methods to reduce keepalive and other background traffic in the mobile network.

Figure 2C:
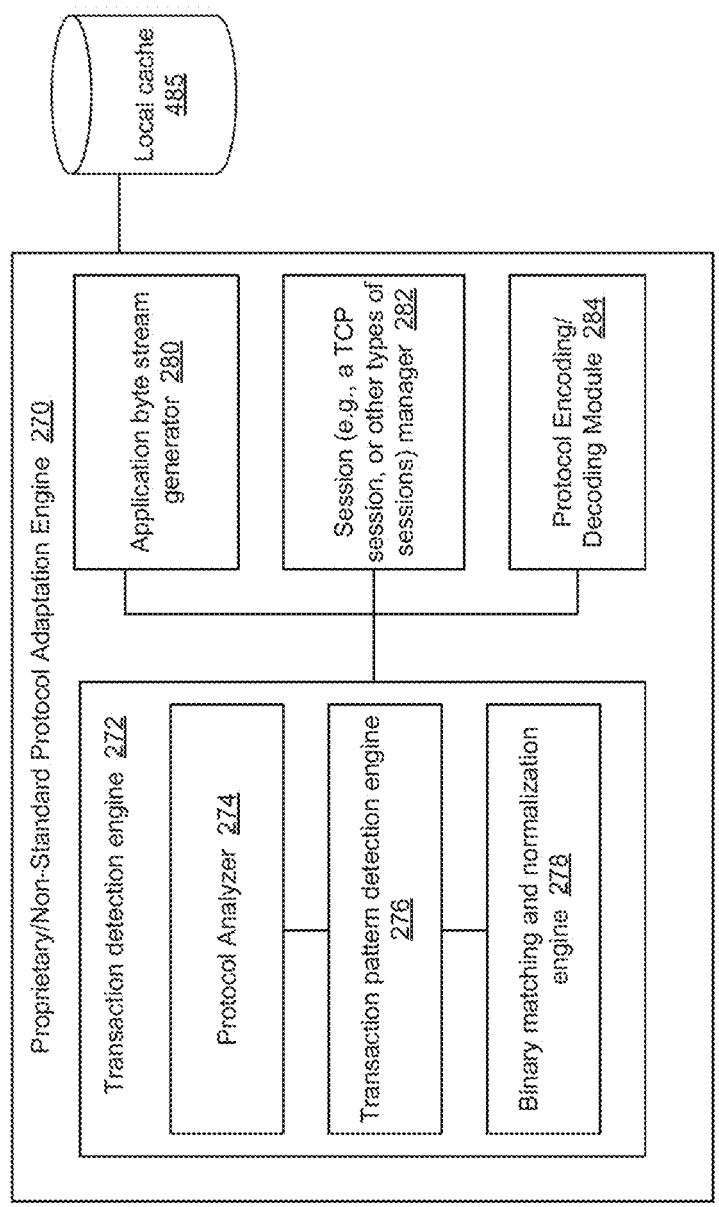
FIG. 2C illustrates an example diagram depicting additional components in the proprietary/non-standard protocol adaptation engine shown in the example of FIG. 2A.

FIG. 2C depicts a block diagram illustrating additional components in the proprietary/non-standard protocol adaptation engine 401 shown in the example of FIG. 2A. In one embodiment, the proprietary/non-standard protocol adaptation engine 401 can be a part of the local proxy 275. Alternately, the proprietary/non-standard protocol adaptation engine 401 can be implemented separately outside of the local proxy 275.

The proprietary/non-standard protocol adaptation engine 401 can include, for example, a transaction detection engine 272 having a protocol analyzer 274, a transaction pattern detection engine 276, a binary matching and normalization engine 278, an application byte stream generator 280, a TCP session manager 282 and/or a protocol encoding/decoding module 284. Additional or less modules/engines can be included. The various components of the proprietary/non-standard protocol adaptation engine 401 on the mobile device or user equipment (UE) 250 can singularly or in any combination perform the following functions and features related to signaling optimization in a wireless network for traffic utilizing proprietary and nonproprietary protocols.

In one embodiment, the local proxy 275 or the proprietary/non-standard protocol adaptation engine 401 captures the TCP stream from an application and passes it on as a byte stream via a byte stream interface provided by the application byte stream generator 280. A byte stream can be read from or can be written to by an application without having to account for protocol-specific formatting, sizing, and other details.

The TCP session manager 282 can, in one embodiment, manage TCP sessions including establishing of TCP sessions with a proxy server (e.g., proxy server 125) and/or the content server (e.g., content server 110) and tearing down or termination of TCP sessions. Although the discussion is with respect to TCP sessions, other similar or session-based protocols may be implemented. In one implementation, the TCP session manager 282 can establish a first TCP session between an application and the local proxy 275 or the proprietary/non-standard protocol adaptation engine 270. The TCP session manager 282 can also establish a TCP session between the local proxy 275 (or the proprietary/non-standard protocol adaptation engine 270) and a server (e.g., proxy server 125, an application or content server 110). Byte streams from the application can be passed over the first TCP session to the keepalive optimizer 300, which can then be sent over to the server over the second TCP session. The TCP session manager 282 may also allow the application to establish the necessary handshakes.

In one embodiment, the transaction detection engine 272 can detect and identify transactions based on analysis of the protocol headers and other protocol peculiarities. Such protocol specific analysis can be performed by a protocol analyzer 274. For example, the protocol analyzer 274 can detect transactions in HTTP protocol based on HTTP header, formatting, encoding, and the like.

In another embodiment, the transaction detection engine 272 can be protocol agnostic, and can detect and/or identify transactions without knowing or understanding details of the underlying protocols. For example, the transaction detection engine 272 can directly monitor byte streams captured from applications (e.g., by the application byte stream generator 280 interface) and detect and/or identify transactions based on observed and/or extracted patterns of byte streams and/or matching or determining content in byte streams. In one implementation, for example, the transaction pattern detection engine 276 can monitor, detect and/or extract various patterns embedded in byte streams corresponding to transactions from applications. One such pattern can be idle time between transactions. The pattern detection engine 276 can monitor byte streams from an application over time, and detect an idle time of two minutes occurring in between transactions, without knowing or understanding the details of the protocol used by the application. Other patterns that can be identified or extracted can resemble those identified by the distributed proxy system (e.g., the local proxy 275 and/or the proxy server 125) for HTTP or other standard protocols.

In one embodiment, the proprietary/non-standard protocol adaptation engine 401 can include a protocol encoding/decoding module 284. In implementations where a binary stream is encapsulated within a security and/or encryption protocol such as Transport Layer Security (TLS), Secure Sockets Layer (SSL), and the like, the encoding/decoding module may include capabilities for decoding such protocols to extract the binary stream.

Figure 3A:
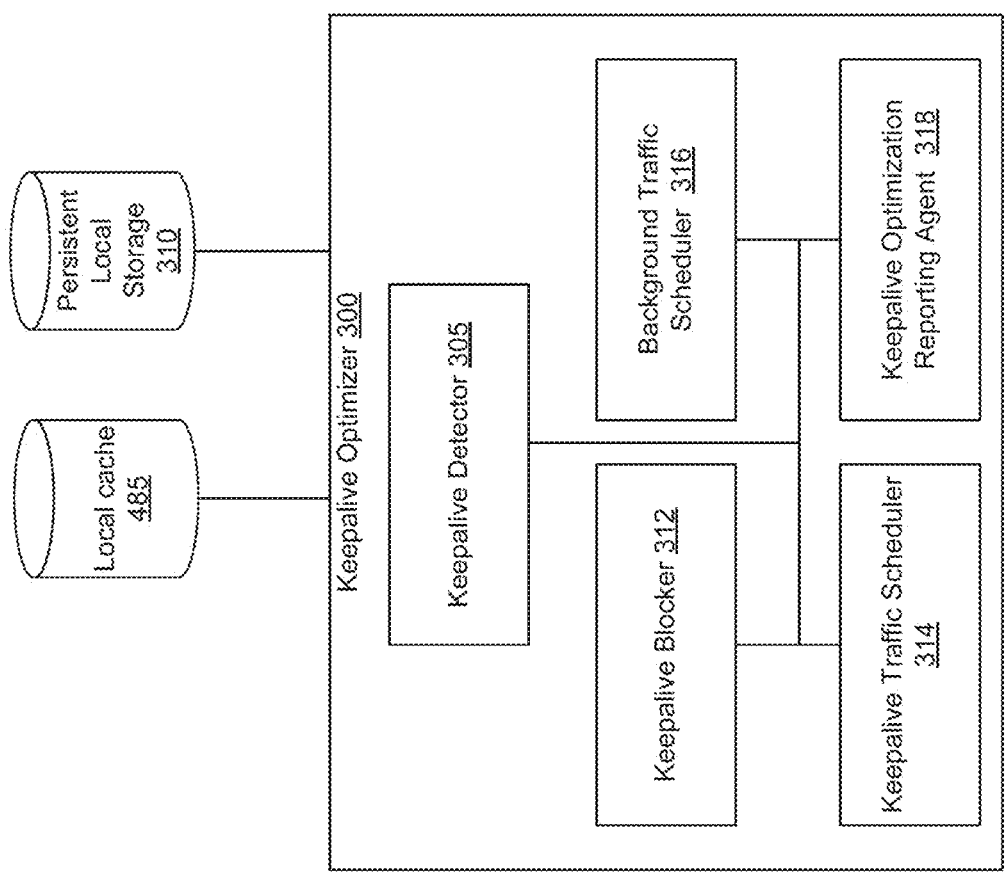
FIG. 3A illustrates an example diagram depicting an example of components including a keepalive blocker, a keepalive traffic scheduler, a background traffic scheduler and a keepalive optimization reporting agent in the keepalive optimizer of FIG. 2A.

FIG. 3A illustrates an example diagram depicting an example of components in the keepalive optimizer 300 of FIG. 2A.

In optimizing signaling in a wireless network, managing long-lived network connections, managing mobile device power usage and/or bandwidth consumption, one or more keepalive and other background traffic optimization strategies can be implemented. For example, the keepalive optimizer 300 can detect, intercept and categorize keepalives or other non-interactive or background traffic as safe or unsafe based on predicted or known impact on user experience or other functionality and selectively block the safe keepalives from going out to the network, thereby reducing the keepalive traffic in the network and conserving bandwidth and power resources. Similarly, the keepalive optimizer 300 can execute keepalives in advance of their expected schedules to maintain long-lived connections or extend keepalive periods to minimize the number of times the radio of a mobile device needs to turn on and off and/or the frequency or interval at which keepalives and other background traffic is sent to the network. These keepalive optimization strategies can be used alone or in combination to facilitate management of keepalive and other background traffic, management of connection and resource conservation in mobile networks.

In one embodiment, the keepalive optimizer 300 can reside in the local proxy 275 and operate as part of the local proxy 275. In another embodiment, the keepalive optimizer 300 can be included in the operating system (OS) (e.g., as a background service or application that is transparent to the end user) by OS manufacturers or mobile device manufacturers (e.g., part of the Android OS, part of the customized Android OS in SAMSUNG smart phones). In yet another embodiment, an application (e.g., 210, 220) on the mobile device may include the keepalive optimizer 300. For example, the keepalive optimizer 300 can be the application itself. As an example, a messaging application can have a configuration mode that uses keepalives to maintain an always-on IP connection to the server. The keepalive optimizer 300 in the messaging application can then optimize the keepalive traffic while maintaining the always-on IP connection to the server when the configuration mode is enabled. In other embodiments, a keepalive optimizer 300 on a mobile device 250 can be provided by network service providers (e.g., Verizon, AT&T, T-Mobile) to optimize keepalive or other background traffic in their mobile networks or may be downloaded by a user (e.g., from an app store) to reduce bandwidth and power usage.

Figure 3B:
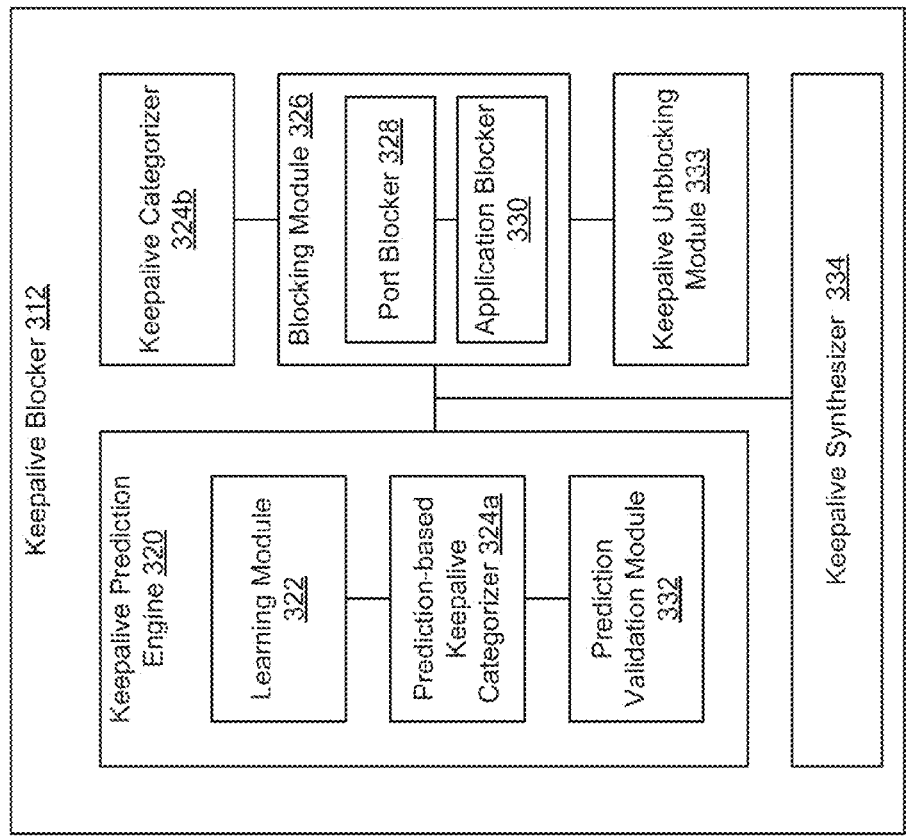
FIG. 3B illustrates an example diagram depicting an example of components in the keepalive blocker of FIG. 3A.
Figure 3C:
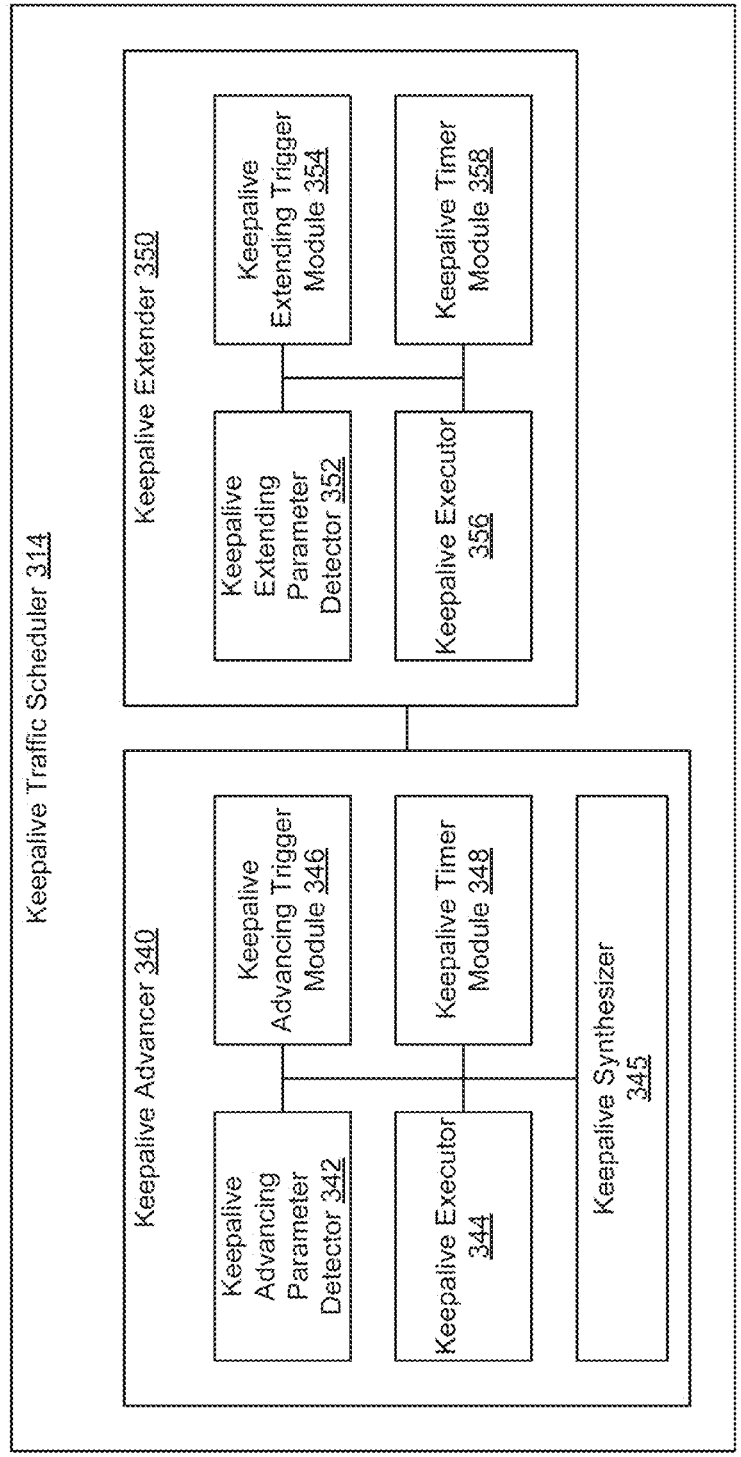
FIG. 3C illustrates an example diagram depicting an example of components in the keepalive traffic scheduler of FIG. 3A.
Figure 3D:
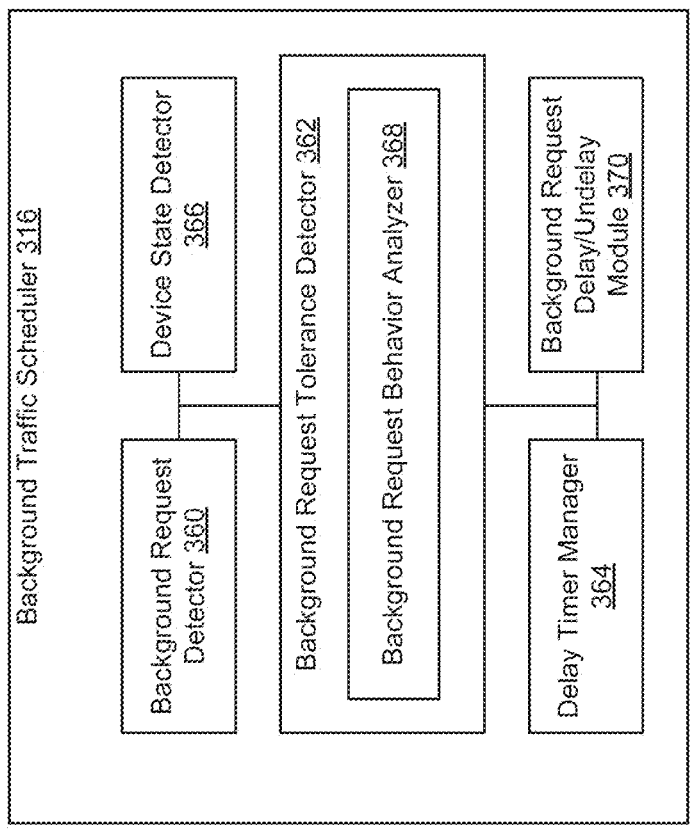
FIG. 3D illustrates an example diagram depicting an example of components in the background traffic scheduler of FIG. 3A.
Figure 4:
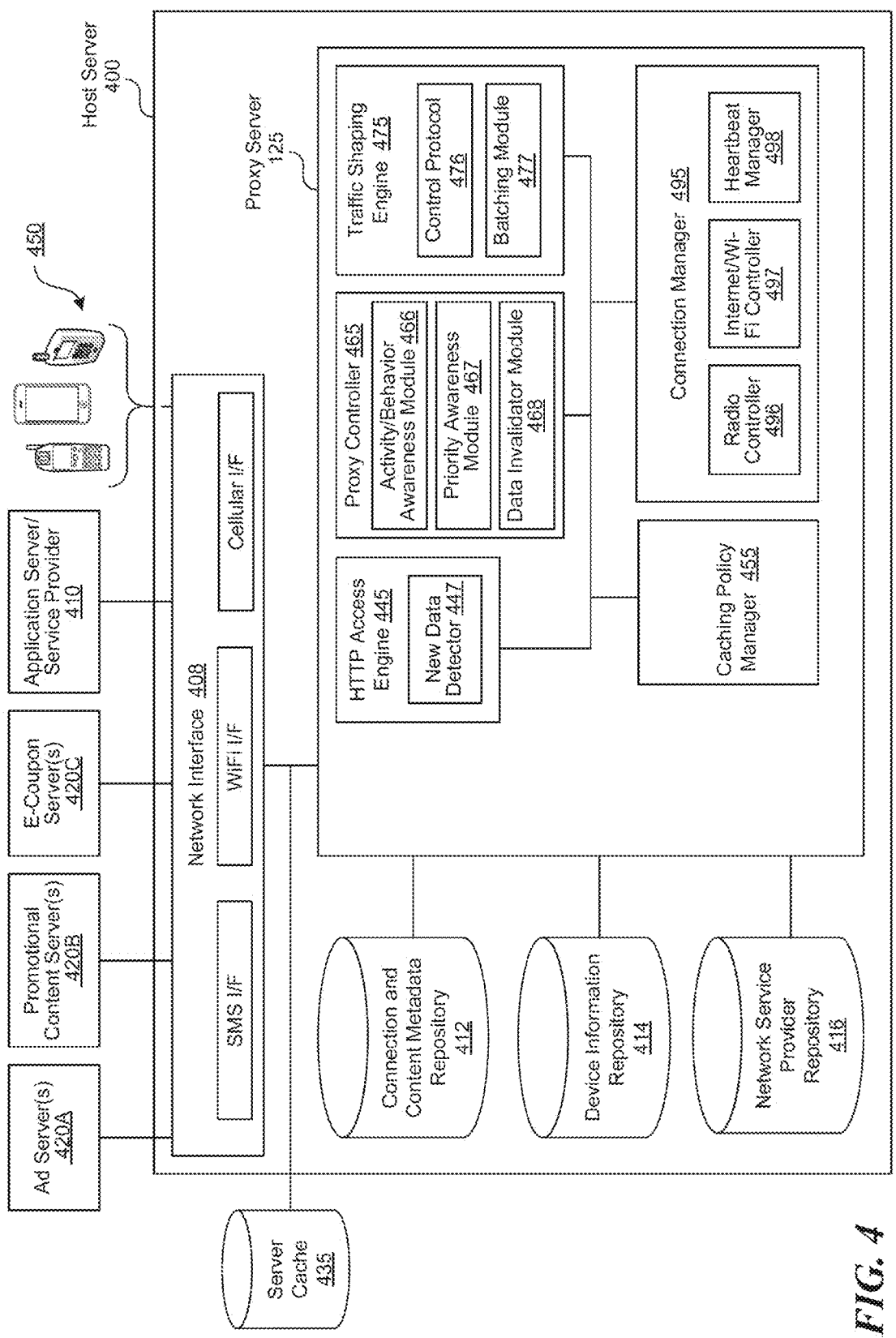
Figure 5:
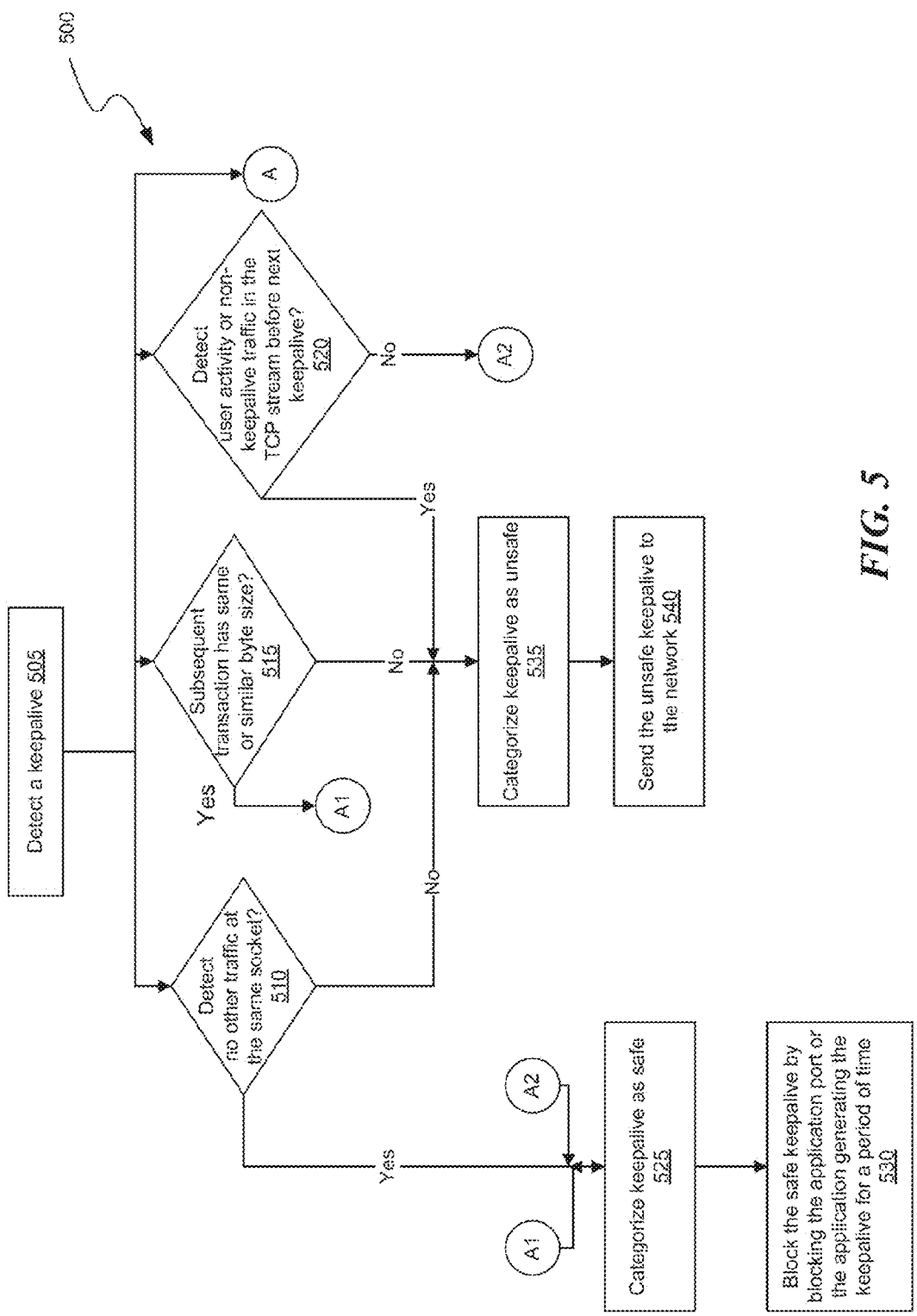
Figure 6:
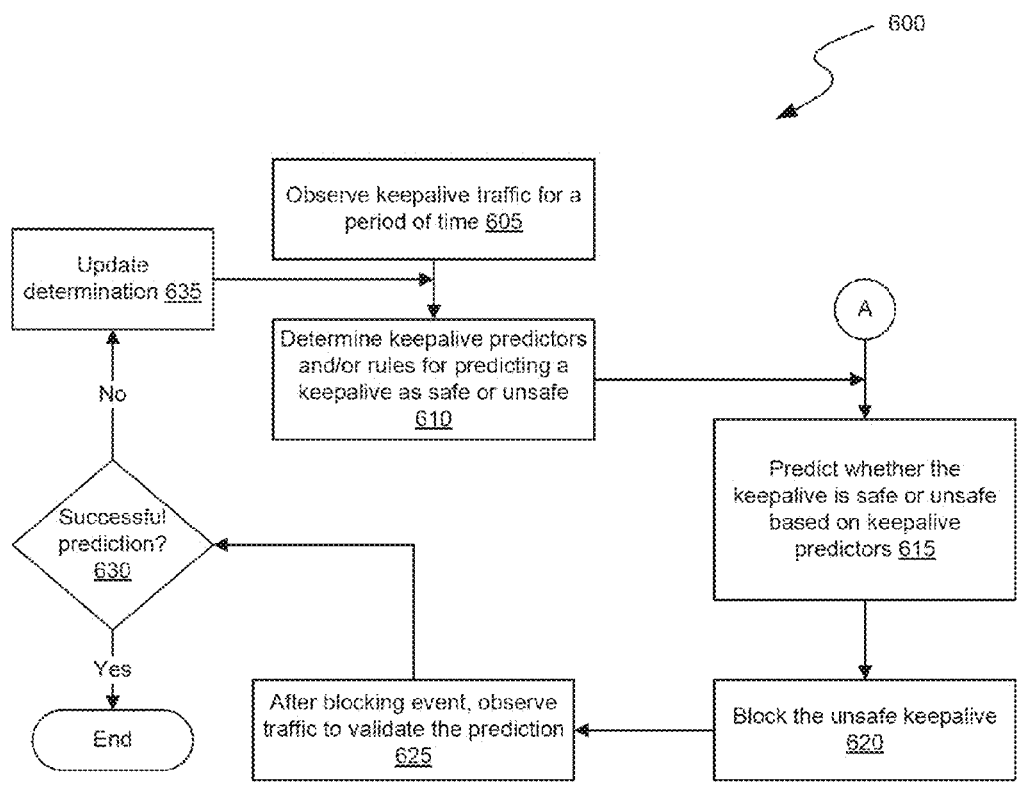
Figure 7:
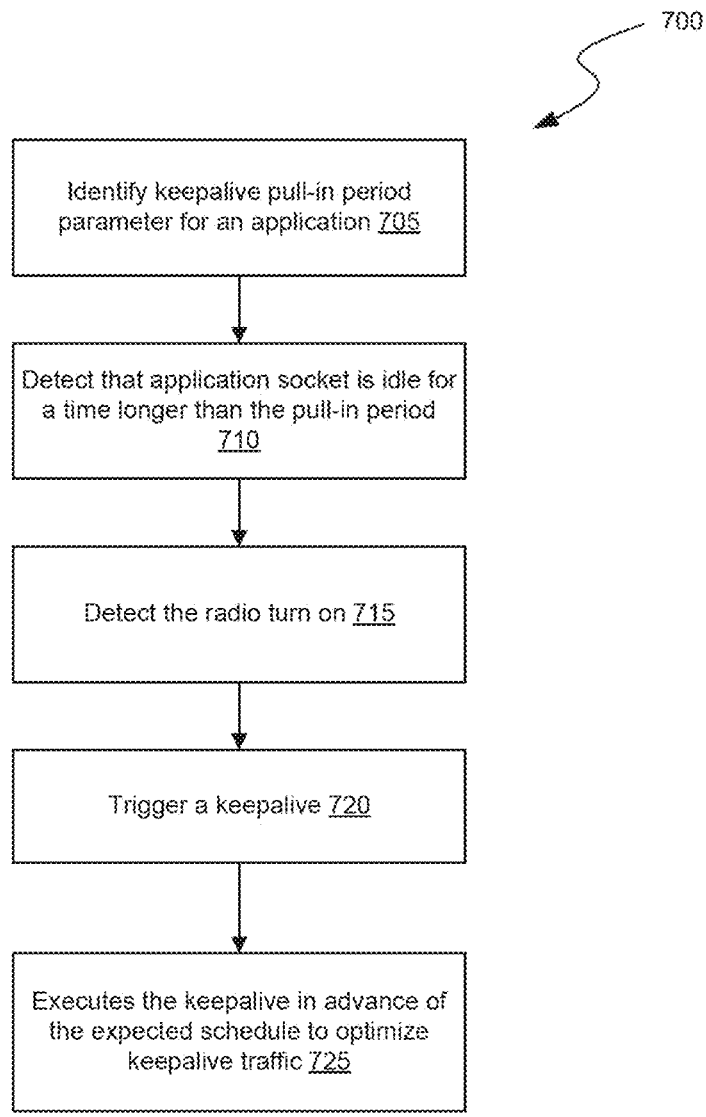
Figure 8:
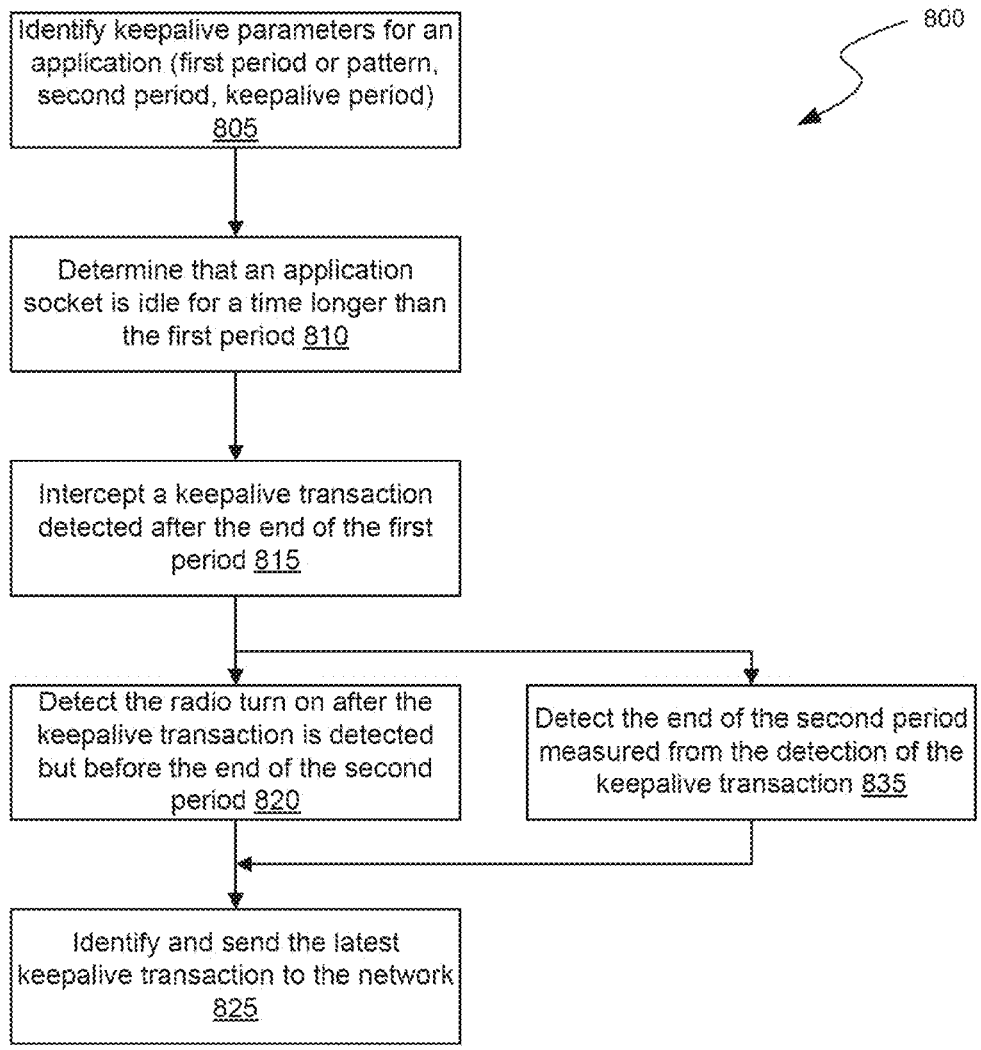
Figure 9:
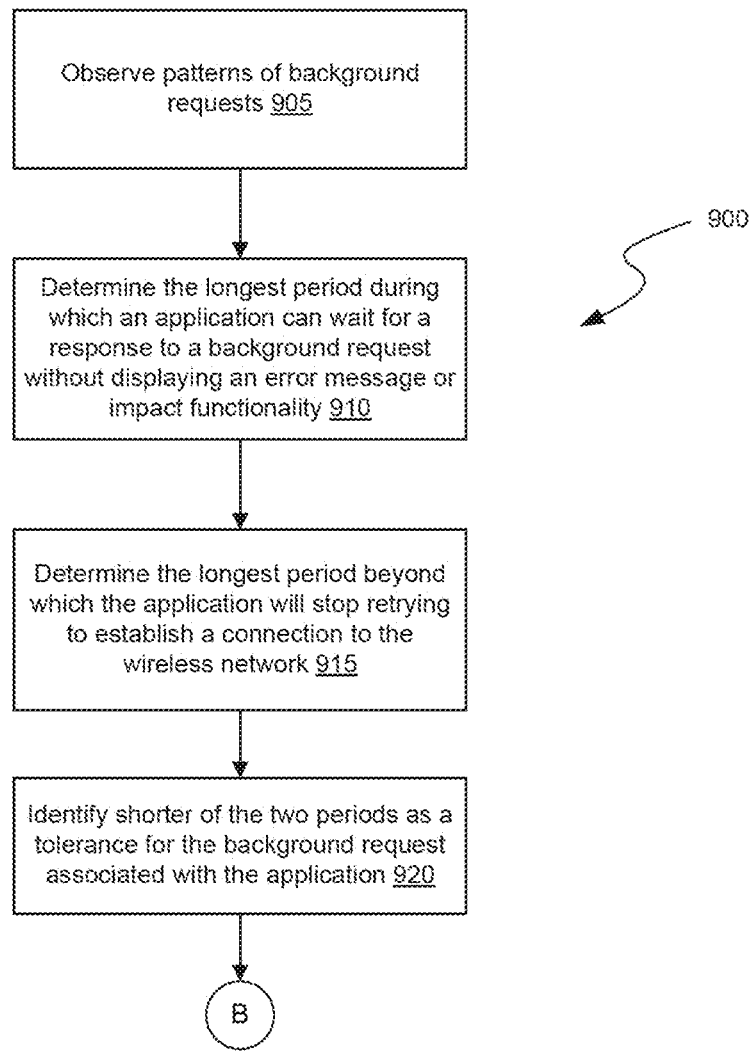

In one embodiment, the keepalive optimizer 300 can include a keepalive detector 305, a keepalive blocker 312, a keepalive traffic scheduler 314, a background traffic scheduler 316 and/or a keepalive optimization reporting agent 318. In some embodiments, one or more of these components can be optional. For example, one embodiment of the keepalive optimizer 300 can include the keepalive detector 305, the keepalive blocker 312 and the keepalive optimization reporting agent 318. FIG. 3B illustrates an example diagram depicting an example of components in the keepalive blocker 312 of FIG. 3A. FIG. 3C illustrates an example diagram depicting an example of components in the keepalive traffic scheduler 314 of FIG. 3A. FIG. 3D illustrates an example diagram depicting an example of components in the background traffic scheduler 316 of FIG. 3A.

In one embodiment, the keepalive detector 305 detects or identifies keepalives. The keepalive detector 305 can detect keepalives based on one or more parameters, such as but not limited to: periodicity, size thresholds, similar/repeating content, and/or based on knowledge of the actual application level protocol. In one embodiment, the keepalive detector 305 can analyze timeout detection and recovery messages or socket level network communication log (netlog) data to identify keepalives from data streams. These and other methods of keepalive detection are disclosed in related application Ser. No. 61/836,039 titled "IDENTIFICATION AND REPORTING OF KEEP ALIVE MESSAGES AND OTHER NON-USER INTERACTIVE TRAFFIC IN A MOBILE NETWORK" filed on Jun. 17, 2013, which is expressly incorporated by reference herein.

Referring to FIG. 3B and as described in reference to FIG. 1A-1, in one embodiment, the keepalive blocker 312 optimizes keepalives originating at a mobile device by blocking keepalives based on whether they are necessary or unnecessary. In one embodiment, the keepalive blocker 312 categorizes a keepalive from an application as a safe keepalive or an unsafe keepalive, in which a safe keepalive is a candidate for keepalive optimization. The keepalive optimization can include blocking the safe keepalive without causing an impact on the health of a connection between the application and a server to which the keepalive is directed. In one embodiment, the keepalive categorizer 324b can categorize a keepalive (e.g., detected by the heartbeat manager 267 of FIG. 2A) as a safe keepalive when no other traffic is detected at the same socket where the keepalive is detected. In another embodiment, the keepalive categorizer 324b can categorize a keepalive as a safe keepalive when transactions following the keepalive have same or similar byte size. In yet another embodiment, the keepalive categorizer 324b can categorize a keepalive as an unsafe keepalive when an indication of user activity (e.g., from the user activity module 215 of FIGS. 2A-2B) or non-keepalive traffic (e.g., from application traffic categorizer 241d/application behavior detector 236 from FIG. 2A-2B) is detected in the same TCP stream that includes the keepalive.

Once a keepalive is categorized as safe or unsafe by the keepalive categorizer 324b, the keepalive blocker 312 allows the unsafe keepalive to go to the server (by not blocking) in order to maintain the health of the connection between the application and the server or blocks the safe keepalive from going out to the server (via blocking module 326). By blocking at least some of the safe or unnecessary keepalives, the radio can be turned on and off less frequently, thereby reducing unnecessary signaling in the mobile network.

In one embodiment, the keepalive blocker 312 includes a keepalive prediction engine 320 having a learning module 322, a prediction-based keepalive categorizer 324a and a prediction validation module. The keepalive prediction engine 320 (e.g., via the learning module 322) observes keepalive traffic for a period of time to identify one or more factors for predicting whether a keepalive is a safe or unsafe keepalive. Such factors or predictors can include, but are not limited to: user, application, hour of the day, day of the week, keepalive interval, keepalive byte size, on screen activity or number of consecutive safe keepalives. In one embodiment, the learning module 322 can be used to generate a rule set for identifying safe keepalives from unsafe keepalives. Based on one or more of the predictors and/or the rule set for keepalive categorization or classification, the keepalive blocker 312 (e.g., via the prediction-based keepalive categorizer 324a) categorizes the keepalive as a safe or unsafe keepalive based on the one or more factors. As before, once the keepalive is categorized or classified as safe or unsafe, the keepalive blocker 312 (e.g., via the blocking module 326) optimizes the keepalive by blocking the safe keepalive from going out to the server. In one embodiment, the decision list learning and blocking algorithm and binary list learning and blocking algorithm described in the present disclosure can be used to categorize a keepalive as safe or unsafe and selectively block the safe keepalive while allowing the unsafe keepalive to be transmitted normally.

The blocking module 326 can block specific keepalives by blocking the ports used by applications that sent the keepalives (e.g., via the port blocker 328) or by blocking the applications themselves (e.g., via the application blocker 330) for a duration of time that can be defined by the PMS or the application. In one embodiment, the unblocking can occur after the end of the defined duration of time, or after an unblocking event occurs. The keepalive unblocking module 333 can detect the end of the blocking period or other unblocking events such as the screen turning on or change in other external parameters representing start of active usage of the application or the device by the user (i.e., indication of user activity), or deviation from the predicted pattern. Other unblocking events can include, for example, a push message coming in through a parallel push channel, indicating that there is a time-critical message for the application, switching to a network that is not configured for optimization (e.g., Wi-Fi), or the like.

In one embodiment, the prediction validation module 332 can observe traffic after the blocking of the safe keepalive or after the unblocking event to validate whether the prediction was successful (i.e., no necessary keepalive traffic was incorrectly categorized as unnecessary and blocked) or not (i.e., necessary keepalive traffic missed because it was incorrectly categorized as unnecessary). The prediction validation module 332 can observe the initial data transfer in establishing a socket to determine whether the prediction was successful or not. For example, if the prediction validation module 332 detects that a traffic pattern in establishing a socket after the blocking event is different than a traffic pattern in establishing a socket without any pending data, such difference in traffic patterns can indicate that a data transfer was prevented because of miscategorization of an unsafe keepalive as safe keepalive. If the prediction failed, the learning module 322 is triggered to update its observation and analysis to improve the prediction capability of the prediction-based keepalive categorizer 324a. For example, analysis for determining the keepalive predictors can be updated, a new rule set can be generated, thresholds or other parameters can be adjusted, and/or the like.

In one embodiment, instead of blocking the safe keepalive by blocking the application or the port for a duration of time, a response to the safe keepalive can be provided by the keepalive synthesizer 334. The keepalive synthesizer 334 can synthesize, create or generate a keepalive (or a synthetic keepalive) based on knowledge of the previous keepalive responses or acknowledgements, by a prior knowledge of the application protocol, or the like. For example, for a GCM messaging application, the keepalive synthesizer 334 can provide a synthesized response to a keepalive using the knowledge of the protocol and avoid the risk from blocking the application or the port which would also prevent the application from sending out other data as well as the keepalive.

Referring to FIG. 3C, in one embodiment, the keepalive traffic scheduler 314 of the keepalive optimizer 300 includes a keepalive advancer 340 and/or a keepalive extender 350. The keepalive advancer 340 can include a keepalive advancing parameter detector 342, a keepalive advancing trigger module 346, a keepalive executor 344 and a keepalive timer module 348. As described in reference to FIG. 1A-2, the keepalive advancer 340 executes a keepalive (i.e., sends a keepalive) opportunistically, earlier than when an application would normally send it out. In one embodiment, the keepalive advancing parameter detector 342 detects keepalive parameters corresponding to an application. Such keepalive parameters can include a keepalive period (or interval between keepalives) and/or a keepalive pull-in period, which is a threshold for advancement of keepalives defined in order to ensure that keepalives are not sent more frequently than statistically necessary. The pull-in parameter can be configured by the PMS, by the application or determined at run time.

In one embodiment, the keepalive advancing trigger module 346 detects the radio of the mobile device turning on after a socket for the application has been idle for longer than the keepalive pull-in period (e.g., tracked by the keepalive timer module 348) and in response, triggers a new keepalive for execution (e.g., via the keepalive executor 344) in advance of the expected schedule. The keepalive advancing trigger module 346 can trigger a new keepalive by dropping the application socket which would cause the application to piggyback on the radio that is already on to establish a new socket. Alternately, instead of dropping the socket, a new keepalive can be synthesized by the keepalive synthesizer 345. In one embodiment, the keepalive synthesizer 345 can synthesize a keepalive based on an analysis of previous keepalives at run time or based on knowledge or information obtained from offline analysis of keepalives of an application (or using the methods described with respect to keepalive synthesizer 345). The keepalive executor 344 then executes the "advanced" keepalive or the "synthesized" keepalive by transmitting or sending the keepalive to the server.

In some instances, using synthesized keepalives may cause decoupling of the application-side socket (e.g., between application and the local proxy 275) from the network-side socket (e.g., between the local proxy 275 and a server such as the host server 125 or the application server) because checksums between the two sockets may be mismatched. In this instance, data from the network socket to the application socket may get rejected by the application. The rejection, however, would cause the application to re-establish the connection and because the servers are designed to retry sending data in the event of failure, there will be no data loss, with the data reaching the application after a slight delay.

As described in reference to FIG. 1A-3, in one embodiment, the keepalive extender 350 optimizes keepalive traffic originating at a mobile device by identifying keepalive parameters corresponding to an application (e.g., via the keepalive extending parameter detector 352) and utilizing the keepalive parameters to execute a keepalive after a delay to optimize the keepalive traffic. In one embodiment, the keepalive parameters utilized in executing the keepalive after a delay include a first period or a pattern, a second period and the keepalive period. In one embodiment, the keepalive extending trigger module 354 detects a first keepalive after a socket for the application has been idle for longer than the first period (e.g., as tracked by the keepalive timer module 358) and delays the keepalive until the radio turns on or the second period from the detecting of the first keepalive elapses. The keepalive extending trigger module 354 then triggers the keepalive executor 356 to execute the keepalive. Because the keepalive is delayed until the radio turns on or until a second period of time from the detecting of the first keepalive elapses, the keepalive period can be extended up to the time corresponding to the second period.

Referring to FIG. 3D and as described in reference to FIG. 1A-4, in one embodiment, the background traffic scheduler 316 can optimize background traffic originating at a mobile device by identifying a background request from an application that can be delayed for transmission to a wireless network (e.g., via the background request detector 360). The background request detector 360 can characterize a request from an application as a background request based on an indication of a lack of user interaction with the application or the mobile device or the lack of user interaction with the application/device in combination with other information relating to status of the application or status of the mobile device (e.g., status of input/output mechanisms of the mobile device). The background traffic scheduler 316 then delays the background request for a period of time when a state of the mobile device meets a delay criteria. In one embodiment, the delay criteria is met when the state of the mobile device is characterized by the mobile device as being connected to a mobile network, being in a transparent mode, having a screen turned off and having a radio turned off. The state of the mobile device can be determined and tracked by the device state detector 366.

In one embodiment, the background request tolerance detector 362 of the background traffic scheduler 316 identifies, detects or determines a tolerance for a background request which can be used to determine the period of time for which the background request is delayed. A background request's tolerance is the shorter of the longest period during which an application that generated the background request will not display an error message to a user of the mobile device and the longest period beyond which the application will stop retrying to establish a connection to the wireless network. The background request tolerance detector 362 via the background request behavior analyzer 368 can observe patterns of background requests comprising the background traffic which can be used to identify a tolerance for a background request. For example, the background request behavior analyzer 368 can gradually increase the delay for each type of background request and observe the application's behavior. Different applications or background request types can exhibit different behavior in response to delay in receiving a response to a background request. One application may time out and close the socket when a response to a given type of background request is not received within a given time (e.g., 15 seconds), while another may retry the same background request multiple times before finally timing out (e.g., retry the background request every 30 seconds, 45 seconds and 1 minute and then time out when no response is received after the fourth attempt). Yet another application may behave erratically when a response is not received within a given time that can impact the user experience with the application, while other applications may not exhibit any behavior that can disrupt or impact the user experience. For example, a background request for a "log upload" from one mobile application may tolerate a longer delay because the request type is not time critical, while a background request for data/status updates from the same application may have a shorter tolerance for delay. The background request behavior analyzer 368 can, based on observation of background traffic and/or application behavior, identify a background request that has no impact on functionality or user experience on the mobile device. The background request tolerance detector 362 can then utilize such information to set a predefined or default tolerance for such background request with significantly large tolerance.

Because different types of background requests and/or applications can have different tolerances and can thus be delayed for different periods of time, the background request delay/undelay module 370 can use or instantiate different timers (or counters via the delay timer manager 364) to delay background requests of different types. For example, background data traffic associated with a log upload can be delayed for 5 minutes (i.e., its tolerance detected by the tolerance detector 362) using a timer $Timer_1$ while a background request for data update (e.g., score update for ESPN application) can be delayed for 3 minutes (i.e., its tolerance detected by the tolerance detector 362) using timer $Timer_2$. Thus, in one embodiment, each background request can be delayed for the maximum period of time that it has tolerance for. Alternately, in another embodiment, the background request delay/undelay module 370 can identify and delay a first background request and a subsequent or second background request using the same counter/timer when the subsequent background request is determined to have no impact on functionality or user experience on the mobile device (e.g., via background request behavior analyzer 368). For example, a first background request received at time $T_0$ having a tolerance of 120 seconds and a subsequent background request received at time $T_0+40$ seconds that is determined to have no impact on the functionality/user experience can both be delayed until time $T_0+120$ seconds using the same timer.

In one embodiment, a TCP session that includes a background request may also include a user-interactive request. In this instance, the user-interactive request can be transmitted to the wireless network without delay, while the background request is delayed by the background request delay/undelay module 370 for a period of time allowed by its tolerance. In another embodiment, a TCP session that includes the background request may include another background request having a longer or shorter tolerance than that of the background request; and wherein each background request is delayed for the maximum period of time allowed by the associated tolerance.

The device state detector 366 can detect a change in the state of the mobile device. The change in the state (or device state) of the mobile device can be triggered by any one of: a screen of the mobile device turning on, a radio of the mobile device turning on, the mobile device connecting to Wi-Fi, the mobile device switching to a transparent mode or disabling of the optimization of the background traffic. The delay timer manager 364 can detect expiration of a delay timer tracking the period of time that a background request is being delayed. The background request delay/undelay module 370 can, in response to the change in the state of the mobile device and/or detection of the expiration of the period of time, undelay the background request and schedule its transmission to the wireless network.

In one embodiment, a DNS module 249 of the caching policy manager 245 depicted in FIG. 2A can cache a DNS request associated with the background request to prevent the DNS request from changing the state of the mobile device and causing the mobile device to transmit the background request to the wireless network before the end of the period of time.

In one embodiment, the background request can be a repeatable background request, and such repeatable background request can also be detected or observed by the background request detector 360. The background request delay/undelay module 370 can then delay the repeatable background request for a period of time beyond the tolerance. In one embodiment, the background request tolerance detector 362 can extend the tolerance of the application by modifying system timers (e.g., application specific timers, protocol-specific timers such as HTTP timers, network stack timers such as TCP stack timers), alarms or other means to cause the application to execute slower, such that the background request is delayed for a period of time corresponding to the extended tolerance.

In one embodiment, the keepalive optimization reporting agent 318 of the keepalive optimizer 300 depicted in FIG. 3A logs data relating to optimizations performed and state of the device and/or application when the optimizations were performed. For example, the keepalive optimization reporting agent 318 can record each background transaction for the FACEBOOK application that that occurred and the delay state of the mobile device when the transaction occurred. The delay state can, for example, indicate whether the transaction entered a delay mode (i.e., was delayed for a period of time), whether the screen was on, whether the radio was on, whether the undelay trigger was expiration of the delay timer, whether the optimization was enabled, and the like. Similarly, other keepalive and background traffic transactions can be recorded in a log and reported periodically to a host server (e.g., host server 100 or application servers).

FIG. 4 depicts a block diagram illustrating an example of server-side components, in certain embodiments of a distributed proxy and cache system residing on a host server 400 that manages traffic in a wireless network (or broadband network) for resource conservation, content caching, and/or traffic management. In some embodiments, the server-side proxy (or proxy server 125) can further categorize mobile traffic and/or deploy and/or implement policies such as traffic management and delivery policies based on device state, application behavior, content priority, user activity, and/or user expectations.

The host server 400 generally includes, for example, a network interface 408 and/or one or more repositories 412, 414, and 416. Note that server 400 may be any portable/mobile or non-portable device, server, cluster of computers and/or other types of processing units (e.g., any number of a machine shown in the example of FIG. 1B) able to receive or transmit signals to satisfy data requests over a network including any wired or wireless networks (e.g., Wi-Fi, cellular, Bluetooth, etc.).

The network interface 408 can include networking module(s) or devices(s) that enable the server 400 to mediate data in a network with an entity that is external to the host server 400, through any known and/or convenient communications protocol supported by the host and the external entity. Specifically, the network interface 408 allows the server 400 to communicate with multiple devices including mobile phone devices 450 and/or one or more application servers/content providers 410.

The host server 400 can store information about connections (e.g., network characteristics, conditions, types of connections, etc.) with devices in the connection metadata repository 412. Additionally, any information about third-party applications or content providers can also be stored in the repository 412. The host server 400 can store information about devices (e.g., hardware capability, properties, device settings, device language, network capability, manufacturer, device model, OS, OS version, etc.) in the device information repository 414. Additionally, the host server 400 can store information about network providers and the various network service areas in the network service provider repository 416.

The communication enabled by network interface 408 allows for simultaneous connections (e.g., including cellular connections) with devices 450 and/or connections (e.g., including wired/wireless, HTTP, Internet connections, LAN, WiFi, etc.) with content servers/providers 410 to manage the traffic between devices 450 and content providers 410, for optimizing network resource utilization and/or to conserver power (battery) consumption on the serviced devices 450.

The host server 400 can communicate with mobile devices 450 serviced by different network service providers and/or in the same/different network service areas. The host server 400 can operate and is compatible with devices 450 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 5G (IMT-advanced), etc.

In general, the network interface 408 can include one or more of a network adaptor card, a wireless network interface card (e.g., SMS interface, WiFi interface, interfaces for various generations of mobile communication standards including but not limited to 1G, 2G, 3G, 3.5G, 5G type networks such as LTE, WiMAX, etc.), Bluetooth, WiFi, or any other network whether or not connected via a router, an access point, a wireless router, a switch, a multilayer switch, a protocol converter, a gateway, a bridge, a bridge router, a hub, a digital media receiver, and/or a repeater.

The host server 400 can further include server-side components of the distributed proxy and cache system which can include a proxy server 125 and a server cache 435. In some embodiments, the proxy server 125 can include an HTTP access engine 445, a caching policy manager 455, a proxy controller 465, a traffic shaping engine 475, a new data detector 447 and/or a connection manager 495.

The HTTP access engine 445 may further include a heartbeat manager 498; the proxy controller 465 may further include a data invalidator module 468; the traffic shaping engine 475 may further include a control protocol 476 and a batching module 477. Additional or less components/modules/engines can be included in the proxy server 125 and each illustrated component.

In the example of a device (e.g., mobile device 450) making an application or content request to an application server or content provider 410, the request may be intercepted and routed to the proxy server 125 which is coupled to the device 450 and the application server/content provider 410. Specifically, the proxy server is able to communicate with the local proxy (e.g., proxy 175 of the examples of FIG. 1C) of the mobile device 450, the local proxy forwards the data request to the proxy server 125 in some instances for further processing and, if needed, for transmission to the application server/content server 410 for a response to the data request.

In such a configuration, the host 400, or the proxy server 125 in the host server 400 can utilize intelligent information provided by the local proxy in adjusting its communication with the device in such a manner that optimizes use of network and device resources. For example, the proxy server 125 can identify characteristics of user activity on the device 450 to modify its communication frequency. The characteristics of user activity can be determined by, for example, the activity/behavior awareness module 466 in the proxy controller 465 via information collected by the local proxy on the device 450.

In some embodiments, communication frequency can be controlled by the connection manager 495 of the proxy server 125, for example, to adjust push frequency of content or updates to the device 450. For instance, push frequency can be decreased by the connection manager 495 when characteristics of the user activity indicate that the user is inactive. In some embodiments, when the characteristics of the user activity indicate that the user is subsequently active after a period of inactivity, the connection manager 495 can adjust the communication frequency with the device 450 to send data that was buffered as a result of decreased communication frequency to the device 450.

In addition, the proxy server 125 includes priority awareness of various requests, transactions, sessions, applications, and/or specific events. Such awareness can be determined by the local proxy on the device 450 and provided to the proxy server 125. The priority awareness module 467 of the proxy server 125 can generally assess the priority (e.g., including time-criticality, time-sensitivity, etc.) of various events or applications; additionally, the priority awareness module 467 can track priorities determined by local proxies of devices 450.

In some embodiments, through priority awareness, the connection manager 495 can further modify communication frequency (e.g., use or radio as controlled by the radio controller 496, Internet/Wi-Fi Controller 497) of the server 400 with the devices 450. For example, the server 400 can notify the device 450, thus requesting use of the radio if it is not already in use when data or updates of an importance/priority level which meets a criteria becomes available to be sent.

In some embodiments, the proxy server 125 can detect multiple occurrences of events (e.g., transactions, content, data received from server/provider 410) and allow the events to accumulate for batch transfer to device 450. Batch transfer can be cumulated and transfer of events can be delayed based on priority awareness and/or user activity/application behavior awareness as tracked by modules 467 and/or 466. For example, batch transfer of multiple events (of a lower priority) to the device 450 can be initiated by the batching module 477 when an event of a higher priority (meeting a threshold or criteria) is detected at the server 400. In addition, batch transfer from the server 400 can be triggered when the server receives data from the device 450, indicating that the device radio is already in use and is thus on. In some embodiments, the proxy server 125 can order the each messages/packets in a batch for transmission based on event/transaction priority such that higher priority content can be sent first in case connection is lost or the battery dies, etc.

In some embodiments, the server 400 caches data (e.g., as managed by the caching policy manager 455) such that communication frequency over a network (e.g., cellular network) with the device 450 can be modified (e.g., decreased). The data can be cached, for example, in the server cache 435 for subsequent retrieval or batch sending to the device 450 to potentially decrease the need to turn on the device 450 radio. The server cache 435 can be partially or wholly internal to the host server 400, although in the example of FIG. 4 it is shown as being external to the host 400. In some instances, the server cache 435 may be the same as and/or integrated in part or in whole with another cache managed by another entity (e.g., the optional caching proxy server 199 shown in the example of FIG. 1C), such as being managed by an application server/content provider 410, a network service provider, or another third party.

In some embodiments, content caching is performed locally on the device 450 with the assistance of host server 400. For example, proxy server 125 in the host server 400 can query the application server/provider 410 with requests and monitor changes in responses. When changed or new responses are detected (e.g., by the new data detector 447), the proxy server 125 can notify the mobile device 450 such that the local proxy on the device 450 can make the decision to invalidate (e.g., indicated as outdated) the relevant cache entries stored as any responses in its local cache. Alternatively, the data invalidator module 468 can automatically instruct the local proxy of the device 450 to invalidate certain cached data, based on received responses from the application server/provider 410. The cached data is marked as invalid, and can get replaced or deleted when new content is received from the content server 410.

Note that data change can be detected by the detector 447 in one or more ways. For example, the server/provider 410 can notify the host server 400 upon a change. The change can also be detected at the host server 400 in response to a direct poll of the source server/provider 410. In some instances, the proxy server 125 can, in addition, pre-load the local cache on the device 450 with the new/updated data. This can be performed when the host server 400 detects that the radio on the mobile device is already in use, or when the server 400 has additional content/data to be sent to the device 450.

One or more the above mechanisms can be implemented simultaneously or adjusted/configured based on application (e.g., different policies for different servers/providers 410). In some instances, the source provider/server 410 may notify the host 400 for certain types of events (e.g., events meeting a priority threshold level). In addition, the provider/server 410 may be configured to notify the host 400 at specific time intervals, regardless of event priority.

In some embodiments, the proxy server 125 of the host 400 can monitor/track responses received for the data request from the content source for changed results prior to returning the result to the mobile device; such monitoring may be suitable when data request to the content source has yielded same results to be returned to the mobile device, thus preventing network/power consumption from being used when no new changes are made to a particular requested. The local proxy of the device 450 can instruct the proxy server 125 to perform such monitoring or the proxy server 125 can automatically initiate such a process upon receiving a certain number of the same responses (e.g., or a number of the same responses in a period of time) for a particular request.

In some embodiments, the server 400, through the activity/behavior awareness module 466, is able to identify or detect user activity at a device that is separate from the mobile device 450. For example, the module 466 may detect that a user's message inbox (e.g., email or types of inbox) is being accessed. This can indicate that the user is interacting with his/her application using a device other than the mobile device 450 and may not need frequent updates, if at all.

The server 400, in this instance, can thus decrease the frequency with which new or updated content is sent to the mobile device 450, or eliminate all communication for as long as the user is detected to be using another device for access. Such frequency decrease may be application specific (e.g., for the application with which the user is interacting on another device), or it may be a general frequency decrease (e.g., since the user is detected to be interacting with one server or one application via another device, he/she could also use it to access other services) to the mobile device 450.

In some embodiments, the host server 400 is able to poll content sources 410 on behalf of devices 450 to conserve power or battery consumption on devices 450. For example, certain applications on the mobile device 450 can poll its respective server 410 in a predictable recurring fashion. Such recurrence or other types of application behaviors can be tracked by the activity/behavior module 466 in the proxy controller 465. The host server 400 can thus poll content sources 410 for applications on the mobile device 450 that would otherwise be performed by the device 450 through a wireless (e.g., including cellular connectivity). The host server can poll the sources 410 for new or changed data by way of the HTTP access engine 445 to establish HTTP connection or by way of radio controller 496 to connect to the source 410 over the cellular network. When new or changed data is detected, the new data detector 447 can notify the device 450 that such data is available and/or provide the new/changed data to the device 450.

In some embodiments, the connection manager 495 determines that the mobile device 450 is unavailable (e.g., the radio is turned off) and utilizes SMS to transmit content to the device 450, for instance, via the SMSC 162 shown in the example of FIG. 1C. SMS is used to transmit invalidation messages, batches of invalidation messages, or even content in the case where the content is small enough to fit into just a few (usually one or two) SMS messages. This avoids the need to access the radio channel to send overhead information. The host server 400 can use SMS for certain transactions or responses having a priority level above a threshold or otherwise meeting a criteria. The server 400 can also utilize SMS as an out-of-band trigger to maintain or wake-up an IP connection as an alternative to maintaining an always-on IP connection.

In some embodiments, the connection manager 495 in the proxy server 125 (e.g., the heartbeat manager 498) can generate and/or transmit heartbeat messages on behalf of connected devices 450 to maintain a backend connection with a provider 410 for applications running on devices 450.

For example, in the distributed proxy system, local cache on the device 450 can prevent any or all heartbeat messages needed to maintain TCP/IP connections required for applications from being sent over the cellular, or other, network and instead rely on the proxy server 125 on the host server 400 to generate and/or send the heartbeat messages to maintain a connection with the backend (e.g., application server/provider 110 in the example of FIG. 1B). The proxy server can generate the keepalive (heartbeat) messages independent of the operations of the local proxy on the mobile device.

The repositories 412, 414, and/or 416 can additionally store software, descriptive data, images, system information, drivers, and/or any other data item utilized by other components of the host server 400 and/or any other servers for operation. The repositories may be managed by a database management system (DBMS), for example, which may be but is not limited to Oracle, DB2, Microsoft Access, Microsoft SQL Server, PostgreSQL, MySQL, FileMaker, etc.

The repositories can be implemented via object-oriented technology and/or via text files and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

FIGS. 5-6 illustrate example logic flow diagrams for optimizing keepalives by categorizing a keepalive as safe or unsafe and transmitting an unsafe keepalive from a mobile device to the network, while blocking a safe keepalive from going out to the network.

Referring to the method 500 described in FIG. 5, the keepalive optimizer 300 detects a keepalive at block 505. One or more determinations are made at decision blocks 510, 515 and 520 to categorize the keepalive as safe or unsafe. For example, at decision block 510, if the keepalive optimizer detects no other traffic at the same socket where the keepalive is detected, the keepalive is categorized as safe at block 525, otherwise the keepalive is categorized as unsafe at block 535. Similarly, at decision block 515, if a transaction subsequent to the keepalive transaction has the same or similar byte size, then the keepalive optimizer 300 can categorize the keepalive as safe at block 525, otherwise the keepalive is categorized as unsafe at block 535. By way of another example, if the keepalive optimizer 300 detects user activity or non-keepalive traffic in the TCP stream before the next keepalive, the keepalive is categorized as unsafe at block 535, because the user activity or non-keepalive traffic is an indication that eliminating the keepalive may prevent the transmission of user-interactive traffic to the network. When the keepalive is categorized as safe at block 525, the keepalive optimizer 300 at block 530 blocks the safe keepalive by blocking the application from which the keepalive originated or the application port for a period of time. When the keepalive is categorized as unsafe at block 535, the keepalive optimizer 300 can send the unsafe keepalive to the network at block 540.

In one embodiment, after detecting the keepalive at block 505, the process flow continues to method 600 at block 615 in FIG. 6 where the keepalive optimizer 300 predicts whether the keepalive is safe or unsafe based on keepalive predictors or factors that can be used to predict whether the keepalive is safe or unsafe. In one embodiment, the keepalive optimizer 300 observes keepalive traffic for a period of time at block 605 and determines keepalive predictors and/or rules for predicting or classifying a keepalive as safe or unsafe at block 610. These predictors can include, for example, hours of the day, days of the week, keepalive interval, keepalive byte size, on-screen activity, time between last on-screen activity and current keepalive, and/or number of consecutive safe keepalives. At block 620, the keepalive optimizer 300 can block the unsafe keepalive by blocking the application port or the application itself for a duration of time.

In one embodiment, after the blocking event, the keepalive optimizer 300 can observe the traffic to validate the prediction (i.e., whether the prediction was successful or not) at block 625. For example, the keepalive optimizer 300 can observe that a traffic pattern after establishing a socket after a blocking event is different from the traffic pattern after establishing a socket with no pending data to transfer, indicating that an unsafe keepalive was missed which prevented the pending data from being transferred to the network. At block 630, if the prediction was successful, the prediction model is not modified. However, if the prediction was not successful, the prediction model is updated to update the determination of keepalive predictors and/or rules for predicting a keepalive as safe or unsafe at block 635.

FIG. 7 illustrates an example logic flow diagram for optimizing keepalive traffic by advancing a keepalive from its expected schedule. As illustrated in the example method 700, the keepalive optimizer 300 determines, identifies or retrieves a keepalive pull-in parameter for an application at block 705 based on which a keepalive is pulled in or advanced from its expected schedule. At block 710, the keepalive optimizer 300 detects or determines that the application socket is idle for a time longer than the pull-in period. After the application socket has been idle for a time longer than the pull-in period, the keepalive optimizer 300 detects the radio turn on at block 715. In response, the keepalive optimizer 300 triggers a new keepalive at block 720. Triggering the new keepalive can include synthesizing a new keepalive or terminating the connection. Terminating the connection when the radio is on allows the application to send a new keepalive piggybacking on the radio that is already on. At block 725, the keepalive optimizer 300 executes the keepalive by sending the keepalive to the network in advance of the expected schedule. In some embodiments, the keepalive can be executed in advance, i.e., it can occur after identifying a first keepalive period or even before. For example, when the network closes the socket after 2 minutes of inactivity while an application performs keepalive every 3 minutes, the application socket would keep closing the socket causing user experience issues with the application. In this instance, by triggering a new keepalive before the network closes the socket (e.g., after 110 seconds), the keepalive optimizer 300 can keep the long-lived connection alive and improve the user experience.

FIG. 8 illustrates an example logic flow diagram for optimizing keepalive traffic by delaying a keepalive beyond the keepalive period. In the example method 800, the keepalive optimizer 300 identifies keepalive parameters for an application at block 805. Such parameters can include a first period ($X_1$) or pattern, a second period ($X_2$) and/or a keepalive interval. At block 810, the keepalive optimizer 300 determines or detects that a socket for the application has been idle for a time longer than the first period. The keepalive optimizer 300 intercepts any keepalive transactions detected after the end of the first period at block 815. When the keepalive optimizer 300 detects the mobile device radio turn on at block 820 after the first period but before the second period from the detection of a keepalive transaction elapses, the keepalive optimizer 300 identifies and sends the latest keepalive transaction to the network at block 825. Alternately, if the second period from the detection of a keepalive transaction elapses at block 835 before the radio turns on, the keepalive optimizer 300 can identify and send the latest keepalive transaction to the network. Thus, by using the method 700, a keepalive interval of $T_0$ can be extended by up to $X_2$ to $T_0+X_2$.

Figure 10:
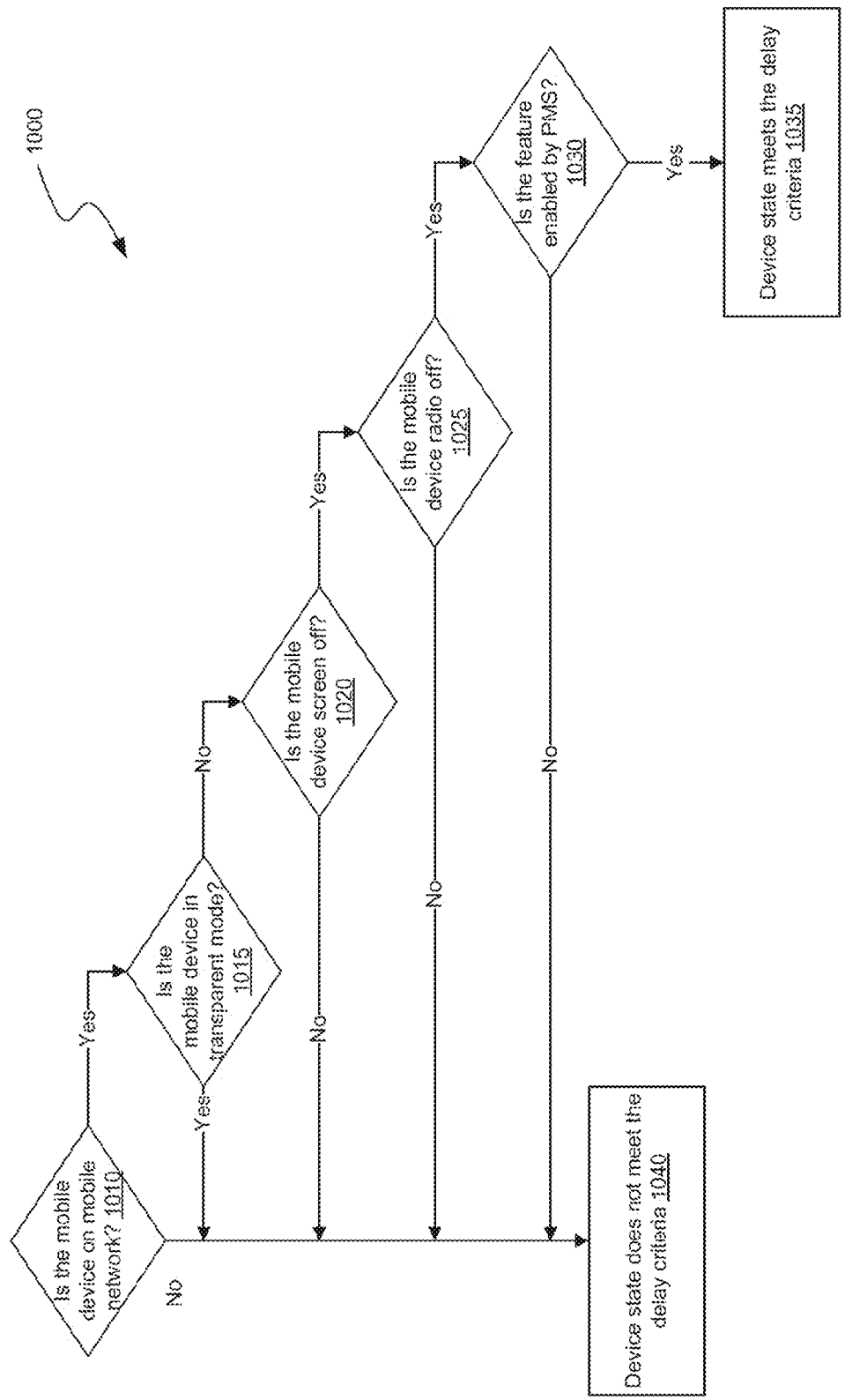
Figure 11:
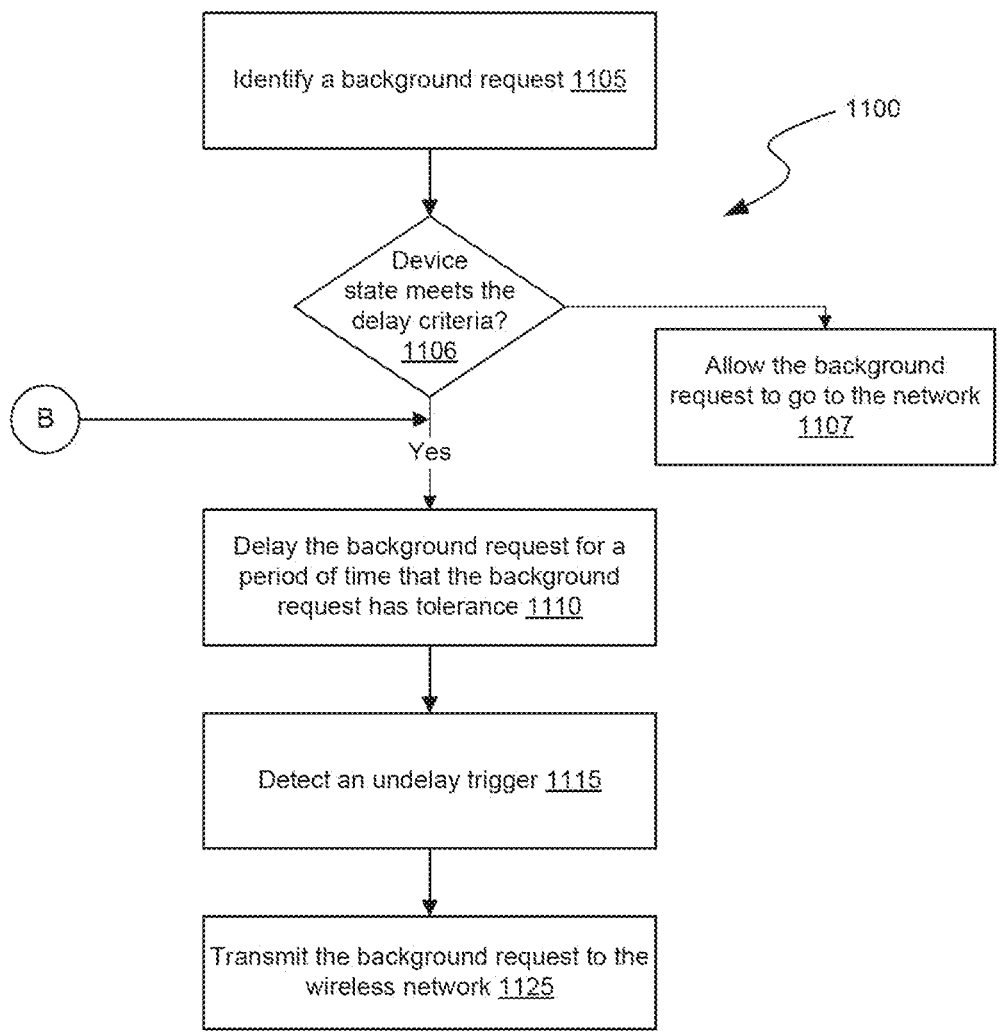

FIGS. 9-11 illustrate example logic flow diagrams for optimizing background traffic by delaying repeatable background requests.

The example method 900 of FIG. 9 shows the determination of application tolerance for a background request. At block 905, the keepalive optimizer 300 observes patterns of the background request. In one embodiment, the observation is related to the behavior of the application(s) from where the background request originates. From the observation, the keepalive optimizer 300 determines the longest period during which an application can wait for a response to a background request without displaying an error message, impacting the functionality of the application or the user experience at block 910. At block 915, the keepalive optimizer 300 determines the longest period beyond which the application will stop retrying to establish a connection to the wireless network. At block 920, the keepalive optimizer 300 determines or identifies the shorter of the two periods from blocks 910 and 915 as the tolerance for the background request at block 920. For example, the keepalive optimizer 300 may observe that the WEATHER mobile application waits for a period of 150 s to receive a response to the "weather update" background request from the WEATHER application server before displaying an error message to the user and that the application retries the request rapidly in intervals of 10 s, 60 s and 120 s before stopping the retry attempts. In this example, the background request has a tolerance of 120 s.

Referring to the example method 1000 in FIG. 10, the keepalive optimizer 300 collects data characterizing the device state of the mobile device to determine if the device state meets the delay criteria. In one embodiment, the keepalive optimizer 300 determines that the device state meets the delay criteria at block 1035 if the mobile device is on the mobile network (at decision block 1010), the mobile device is not in transparent mode (at decision block 1015), the mobile device has screen off (at decision block 1020), the mobile device has radio off (at decision block 1025) and the optimization is enabled by the PMS (at decision block 1030). Alternately, if the mobile device is not on the mobile network (at decision block 1010), the mobile device is in transparent mode (at decision block 1015), the mobile device has screen on (at decision block 1020), the mobile device has radio on (at decision block 1025) or the optimization is disabled by the PMS (at decision block 1030), at block 1040, the keepalive optimizer 300 determines that the device state does not meet the delay criteria.

Referring to the example method 1100 of FIG. 11, the keepalive optimizer 300 identifies a background request at block 1105 determines whether the device state meets the delay criteria at decision block 1106, If the device state meets the delay criteria, the keepalive optimizer 300 delays the background request for a period of time that the background request has tolerance for (e.g., based on information item B from FIG. 9) at block 1110. Conversely, if the device state fails to meet the delay criteria, the background request is not delayed, and is instead allowed to go to the network at block 1107. At block 1115, the keepalive optimizer 300 detects an undelay trigger. The undelay trigger can be a change in the device state of the mobile device (or the device state meeting the undelay criteria) or expiration of a period of time. For example, if the mobile device switches from mobile network to Wi-Fi, the mobile device switches to transparent mode, the mobile device screen turns on, the mobile device radio turns on, the optimization is disabled or turned off or a delay timer tracking the period of time ends, the undelay criteria is met and the background request can be allowed to go to the network. The keepalive optimizer 300 then transmits the background request to the wireless network at block 1125.

Figure 12:
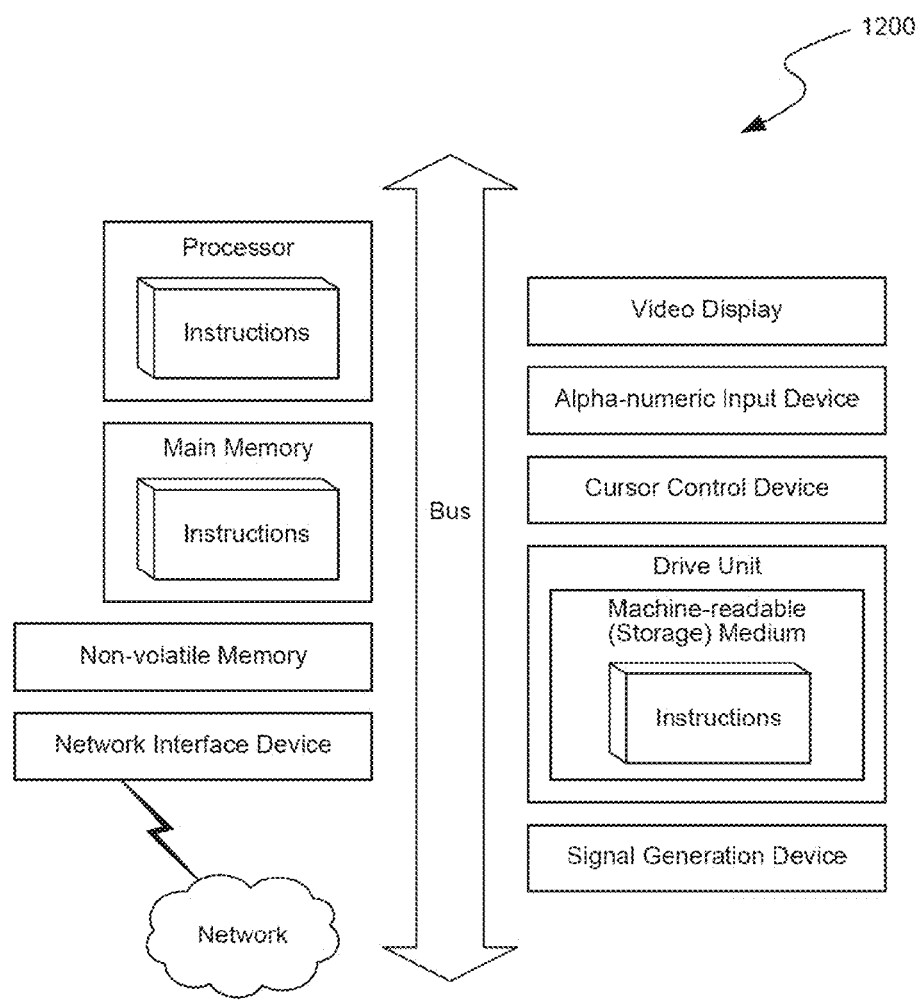
FIG. 12 shows a diagrammatic representation of a machine in the example form of a computer system within which a set of instructions, for causing the machine to perform any one or more of the methodologies discussed herein, may be executed.

FIG. 12 shows a diagrammatic representation of a machine in the example form of a computer system within which a set of instructions, for causing the machine to perform any one or more of the methodologies discussed herein, may be executed.

In the example of FIG. 12, the computer system 1200 includes a processor, memory, non-volatile memory, and an interface device. Various common components (e.g., cache memory) are omitted for illustrative simplicity. The computer system 1200 is intended to illustrate a hardware device on which any of the components depicted in the example of FIGS. 2A-2C (and any other components described in this specification) can be implemented. The computer system 1200 can be of any applicable known or convenient type. The components of the computer system 1200 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 12 reside in the interface.

In operation, the computer system 1200 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 16, other aspects may likewise be embodied as a means-plus-function claim, or in other forms, such as being embodied in a computer-readable medium. (Any claims intended to be treated under 35 U.S.C. § 112, 16 will begin with the words "means for".) Accordingly, the applicant reserves the right to add additional claims after filing the application to pursue such additional claim forms for other aspects of the disclosure.

What is claimed is:

1. A method of optimizing network transactions originating at a mobile device, comprising:
   identifying a keepalive period of a mobile application executing on a mobile device, wherein the mobile application is connected to a server;
   determine a pull-in period by:
      tracking traffic patterns of the mobile device;
      using the traffic patterns of the mobile device to determine a first probability and a second probability, wherein the first probability is the probability of the mobile application consuming resources, and wherein the second probability is the probability of the radio of the mobile device turning on; and
      calculating the pull-in period based on the first probability and the second probability, wherein the pull-in period is a value selected to minimize the mobile application's consumption of resources and the number of instances where the radio of the mobile device needs to be turned on;

wherein the pull-in period has a shorter duration than the keepalive period;

when the mobile application has been idle for longer than the pull-in period, detecting whether a radio of the mobile device turns on;

in response to detecting the radio of the mobile device turn on, triggering a new keepalive to the server before the end of the keepalive period.

2. The method of claim 1, wherein triggering the new keepalive is done on an application-by-application basis.

3. The method of claim 1, wherein triggering the new keepalive includes terminating the connection between the mobile application and the server.

4. The method of claim 1, wherein triggering the new keepalive includes dropping the application socket of the mobile application.

5. The method of claim 1, wherein triggering the new keepalive includes creating a synthetic keepalive to send to the server.

6. The method of claim 1, further comprising optimizing the new keepalive by:
- defining a first extension period and second extension period, wherein the first and second extension periods are pre-determined time values;
- determining if the application has been idle for longer than the first extension period;
- in response to a determination that the application has been idle for longer than the first extension period, extending the keepalive period by the second extension period.

7. A mobile device implementing network transaction optimization, comprising:
- a processor;
- a memory;
- a radio;
- the processor being configured to:
  - identify a keepalive period of a mobile application executing on the mobile device, wherein the mobile application is connected to a server;
  - determine a pull-in period by:
    - tracking traffic patterns of the mobile device;
    - using the traffic patterns of the mobile device to determine a first probability and a second probability,
  - wherein the first probability is the probability of the mobile application consuming resources, and
  - wherein the second probability is the probability of the radio of the mobile device turning on; and
  - calculating the pull-in period based on the first probability and the second probability, wherein the pull-in period is a value selected to minimize the mobile application's consumption of resources and the number of instances where the radio of the mobile device needs to be turned on;
  - wherein the pull-in period has a shorter duration than the keepalive period;
  - when the mobile application has been idle for longer than the pull-in period, detecting whether the radio of the mobile device turns on; and
  - in response to detecting the radio of the mobile device turn on, trigger a new keepalive to the server before the end of the keepalive period.

8. The mobile device of claim 7, wherein the processor is further configured to trigger the new keepalive on an application-by-application basis.

9. The mobile device of claim 7, wherein the processor is further configured to trigger the new keepalive by terminating the connection between the mobile application and the server.

10. The mobile device of claim 7, wherein the processor is further configured to trigger the new keepalive by dropping the application socket of the mobile application.

11. The mobile device of claim 7, wherein the processor is further configured to trigger the new keepalive by creating a synthetic keepalive to send to the server.

12. The mobile device of claim 7, wherein the processor is further configured to optimize the new keepalive by:
- defining a first extension period and second extension period, wherein the first and second extension periods are pre-determined time values;
- determining if the application has been idle for longer than the first extension period;
- in response to a determination that the application has been idle for longer than the first extension period, extending the keepalive period by the second extension period.

* * * * *